(12) United States Patent
Ding et al.

(10) Patent No.: US 10,045,367 B2
(45) Date of Patent: Aug. 7, 2018

(54) UPLINK DATA FRAGMENTATION FOR MULTI-USER NETWORKS

(71) Applicant: QUALCOMM Incorporated, San Diego, CA (US)

(72) Inventors: Gang Ding, San Diego, CA (US); Simone Merlin, San Diego, CA (US); Gwendolyn Denise Barriac, Encinitas, CA (US); George Cherian, San Diego, CA (US); Alfred Asterjadhi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 14/871,888

(22) Filed: Sep. 30, 2015

(65) Prior Publication Data

US 2016/0100421 A1    Apr. 7, 2016

Related U.S. Application Data

(60) Provisional application No. 62/074,482, filed on Nov. 3, 2014, provisional application No. 62/059,356, filed on Oct. 3, 2014.

(51) Int. Cl.
*H04J 3/00* (2006.01)
*H04W 72/12* (2009.01)
(Continued)

(52) U.S. Cl.
CPC ....... *H04W 72/1268* (2013.01); *H04L 1/1614* (2013.01); *H04L 1/1621* (2013.01);
(Continued)

(58) Field of Classification Search
CPC .... H04W 28/065; H04L 47/36; H04L 1/1614; H04L 1/1621
See application file for complete search history.

(56) References Cited

U.S. PATENT DOCUMENTS 7,535,858 B2   5/2009  Trainin et al.
8,355,389 B2   1/2013  Kasslin et al.
(Continued)

FOREIGN PATENT DOCUMENTS

EP      2608599 A1    6/2013
WO   2013130846 A1    9/2013

OTHER PUBLICATIONS

IEEE Standards Association, Part 11: Wireless LAN Medium Access Control (MAC) and Physical Layer (PHY) Specifications; IEEE std 802.11™-2012 (Revision of IEEE Std 802.11-2007), Mar. 29, 2012; 2793 pgs.
(Continued)

*Primary Examiner* — Chi H Pham
*Assistant Examiner* — Fahmida Chowdhury
(74) *Attorney, Agent, or Firm* — Toler Law Group

(57) ABSTRACT

An apparatus for wireless communication includes data generation logic configured to generate data to be transmitted to an access point and to determine that a size of the data exceeds a size of a first transmit opportunity (TX_OP). The apparatus includes data fragmentation logic configured to generate at least a first data fragment and a second data fragment based on the data, where a size of the first data fragment is selected based on the size of the first TX_OP. The apparatus further includes a wireless interface configured to transmit, during the first TX_OP, a first data packet to the access point, the first data packet including the first data fragments.

30 Claims, 13 Drawing Sheets

(51) Int. Cl.
 *H04L 1/16* (2006.01)
 *H04W 28/06* (2009.01)
 *H04W 84/12* (2009.01)
 *H04L 12/805* (2013.01)

(52) U.S. Cl.
 CPC .......... *H04L 1/1628* (2013.01); *H04L 1/1685* (2013.01); *H04W 28/065* (2013.01); *H04W 72/1289* (2013.01); *H04L 47/36* (2013.01); *H04W 84/12* (2013.01)

(56) References Cited

U.S. PATENT DOCUMENTS

| | | |
|---|---|---|
| 2005/0238054 A1 | 10/2005 | Sharma |
| 2006/0056443 A1 | 3/2006 | Tao et al. |
| 2007/0104162 A1* | 5/2007 | Kneckt ................. H04L 47/564 370/338 |
| 2007/0110055 A1* | 5/2007 | Fischer .................. H04L 47/10 370/389 |
| 2010/0189056 A1* | 7/2010 | Nishibayashi ........ H04L 1/1671 370/329 |
| 2011/0149882 A1* | 6/2011 | Gong .................... H04L 1/1685 370/329 |
| 2011/0286377 A1 | 11/2011 | Sampath et al. |
| 2012/0093134 A1 | 4/2012 | Zuniga et al. |
| 2012/0236789 A1* | 9/2012 | Dravida ................. H04L 47/14 370/328 |
| 2012/0294142 A1* | 11/2012 | Kneckt ............... H04W 74/002 370/229 |
| 2012/0314636 A1* | 12/2012 | Liu ..................... H04W 28/065 370/311 |
| 2013/0171999 A1 | 7/2013 | Katar et al. |
| 2013/0223210 A1* | 8/2013 | Asterjadhi ............ H04L 1/0025 370/230 |
| 2013/0229996 A1* | 9/2013 | Wang ................ H04W 72/0413 370/329 |
| 2013/0235737 A1 | 9/2013 | Merlin et al. |
| 2013/0294431 A1* | 11/2013 | Wang ................... H04W 28/06 370/338 |
| 2014/0056223 A1 | 2/2014 | Quan et al. |
| 2014/0328270 A1 | 11/2014 | Zhu et al. |

OTHER PUBLICATIONS

International Search Report and Written Opinion for International Application No. PCT/US2015/053570, ISA/EPO, dated Apr. 28, 2016, 19 pages.
Partial International Search Report for International Application No. PCT/US2015/053570, ISA/EPO, dated Feb. 11, 2016, 7 pages.
European Search Report—EP17192970—Search Authority—The Hague—dated Dec. 14, 2017.

* cited by examiner

UPLINK DATA FRAGMENTATION FOR MULTI-USER NETWORKS

I. CROSS REFERENCE TO RELATED APPLICATIONS

This application claims priority from U.S. Provisional Patent Application No. 62/059,356, filed Oct. 3, 2014 and entitled "UPLINK DATA FRAGMENTATION FOR MULTI-USER NETWORKS", and U.S. Provisional Patent Application No. 62/074,482, filed Nov. 3, 2014 and entitled "UPLINK DATA FRAGMENTATION FOR MULTI-USER NETWORKS"; the contents of each of the aforementioned applications are expressly incorporated herein by reference in their entirety.

II. FIELD

The present disclosure is generally related to uplink data fragmentation for multi-user networks.

III. DESCRIPTION OF RELATED ART

Advances in technology have resulted in smaller and more powerful computing devices. For example, a variety of portable personal computing devices, including wireless telephones such as mobile and smart phones, tablets and laptop computers are small, lightweight, and easily carried by users. These devices can communicate voice and data packets over wireless networks. Further, many such devices incorporate additional functionality, such as a digital still camera, a digital video camera, a digital recorder, and an audio file player. Also, such devices can process executable instructions, including software applications, such as a web browser application, that can be used to access the Internet. As such, these devices can include significant computing and networking capabilities.

Various wireless protocols and standards may be available for use by wireless telephones and other wireless devices. For example, Institute of Electrical and Electronics Engineers (IEEE) 802.11, commonly referred to as "wi-fi," is a standardized set of wireless local area network (WLAN) communication protocols. In current wi-fi protocols, an access point may schedule transmission opportunities (TX_OPs) (such as durations of time during which a particular device may transmit data via a wireless medium) for the access point or for one or more devices, also referred to as stations. The TX_OPs may be downlink (DL) TX_OPs (such as durations of time during which the access point transmits data to the one or more devices) or uplink (UL) TX_OPs, (such as durations of time during which a device, such as a station, transmits data to the access point). Because the access point generates data to be transmitted to the one or more devices (referred to as DL data), the access point may schedule a DL TX_OP having a sufficient size to transmit an entirety of the DL data. However, the access point may not know a size of data to be transmitted from a particular device to the access point (referred to as UL data) and the access point may not be aware of a modulation and coding scheme (MCS) used by the particular device when scheduling a UL TX_OP for the particular device. If a size of the UL data exceeds a size of the UL TX_OP, the particular device may not be able to use the UL TX_OP to transmit the UL data and the particular device may have to wait for a subsequent UL TX_OP to transmit the data to the access point. Thus, a device in a multi-user (MU) wireless network that is allocated a UL TX_OP having a smaller size than UL data is unable to transmit data during the UL TX_OP, and the particular device may not use (or "wastes") the UL TX_OP. Wasted UL TX_OPs increase latency and reduce efficiency of the MU wireless network.

IV. SUMMARY

In the present disclosure, devices of a multi-user (MU) communication system may fragment UL data, such as data to be transmitted from the devices to an access point, into multiple data fragments. At least one data fragment may be included in a data packet that is transmitted from a device, such as a station to the access point via a wireless network during a TX_OP. A size of the data fragment may be selected based on a size of the TX_OP (so that the data fragment is sized to fit within the TX_OP). Additional data fragments of the UL data may be transmitted during subsequent TX_OPs. The access point may be configured to receive multiple data packets during multiple TX_OPs and to defragment multiple data fragments included in the multiple data packets to retrieve the UL data. In this manner, devices in the MU communication system may reduce unused (or wasted) UL TX_OPs by transmitting data packets that include at least a fragment of the UL data instead of refraining from transmitting any data during the UL TX_OPs. The UL data fragmentation techniques and designs described by the present disclosure may operate in accordance with an IEEE 802.11 standard, thus enabling the MU communication system to operate as a wi-fi network, such as an IEEE 802.11 network.

In a particular aspect, an apparatus for wireless communication includes data generation logic configured to generate data to be transmitted to an access point and to determine that a size of the data exceeds a size of a first transmit opportunity (TX_OP). The apparatus includes data fragmentation logic configured to generate at least a first data fragment and a second data fragment based on the data, where a size of the first data fragment is selected based on the size of the first TX_OP. The apparatus further includes a wireless interface configured to transmit, during the first TX_OP, a first data packet to the access point, the first data packet including the first data fragments.

In another particular aspect, an apparatus for wireless communication includes data defragmentation logic configured to receive, during a first transmit opportunity (TX_OP), a first data packet from the first device and a second data packet from the second device, the first data packet including a first data fragment, and the second data packet including a second data fragment. The apparatus includes block acknowledgement (BA) generation logic configured to generate a block acknowledgement (BA) frame including a first BA bitmap and a second BA bitmap, where the first BA bitmap indicates at least the first data fragment received from the first device, and where the second BA bitmap indicates at least the second data fragment received from the second device. The apparatus further includes a wireless interface configured to transmit the BA frame to the first device and to the second device. In a particular implementation, the first BA bitmap and the second BA bitmap are uncompressed BA bitmaps. Alternatively, the first BA bitmap and the second BA bitmap may be semicompressed BA bitmaps.

In another particular aspect, a method includes generating, at a first device, first data to be transmitted to an access point. The method includes determining that a size of the first data exceeds a size of a first transmit opportunity (TX_OP). The method also includes generating at least a first data fragment and a second data fragment based on the first data, where a size of the first data fragment is selected based on the size of the first TX_OP. The method further includes transmitting, during the first TX_OP, a first data packet from the first device to the access point, the first data packet including the first data fragment.

In another particular aspect, a method includes receiving, at an access point during a first transmit opportunity (TX_OP), at least a first data packet from a first device and a second data packet from a second device, the first data packet including a first data fragment and the second data packet including a second data fragment. The method includes generating, at the access point, a block acknowledgement (BA) frame including at least a first BA bitmap and a second BA bitmap, where the first BA bitmap at least the first data fragment received from the first device, and where the second BA bitmap indicates at least the second data fragment received from the second device. The method further includes transmitting the BA frame to the first device.

One particular advantage provided by at least one of the disclosed aspects is that, in a MU communication system, UL data may be fragmented into multiple data fragments for transmission as multiple data packets during multiple UL TX_OPs. Because the UL data is fragmented, a data fragment having a smaller size than an entirety of the UL data may be transmitted when a size of the UL data exceeds a size of a UL TX_OP associated with the device. One or more other fragments of the UL data may be transmitted during one or more subsequent UL TX_OPs to complete transmission of the UL data. In this manner, the device may use a UL TX_OP having a size that is smaller than the size of the UL data to transmit a data fragment instead of "wasting" the UL TX_OP, such as by not using the TX_OP. Reducing unused (or wasted) UL TX_OPs reduces latency and increases efficiency of the MU communication system.

Other aspects, advantages, and features of the present disclosure will become apparent after a review of the entire application, including the following sections: Brief Description of the Drawings, Detailed Description, and the Claims.

V. BRIEF DESCRIPTION OF THE DRAWINGS

VI. DETAILED DESCRIPTION

Particular implementations of the present disclosure are described below with reference to the drawings. In the description, common features are designated by common reference numbers throughout the drawings. As used herein, various terms may be abbreviated as follows: service data unit (SDU), protocol data unit (PDU), media access control (MAC), MAC service data unit (MSDU), MAC protocol data unit (MPDU), aggregated MAC protocol data unit (A-MPDU), physical layer convergence protocol (PLCP), PLCP service data unit (PSDU), PLCP data unit (PPDU). Additional abbreviations may be provided herein. As used herein, the MAC service data unit (MSDU) may alternatively be referred to as a MAC layer service data unit, the MAC protocol data unit (MPDU) may alternatively be referred to as a MAC layer protocol data unit, the aggregated MAC protocol data unit (A-MPDU) may alternatively be referred to as an aggregated MAC layer protocol data unit, and the PPDU may alternatively be referred to as a physical layer protocol data unit.

Figure 1:
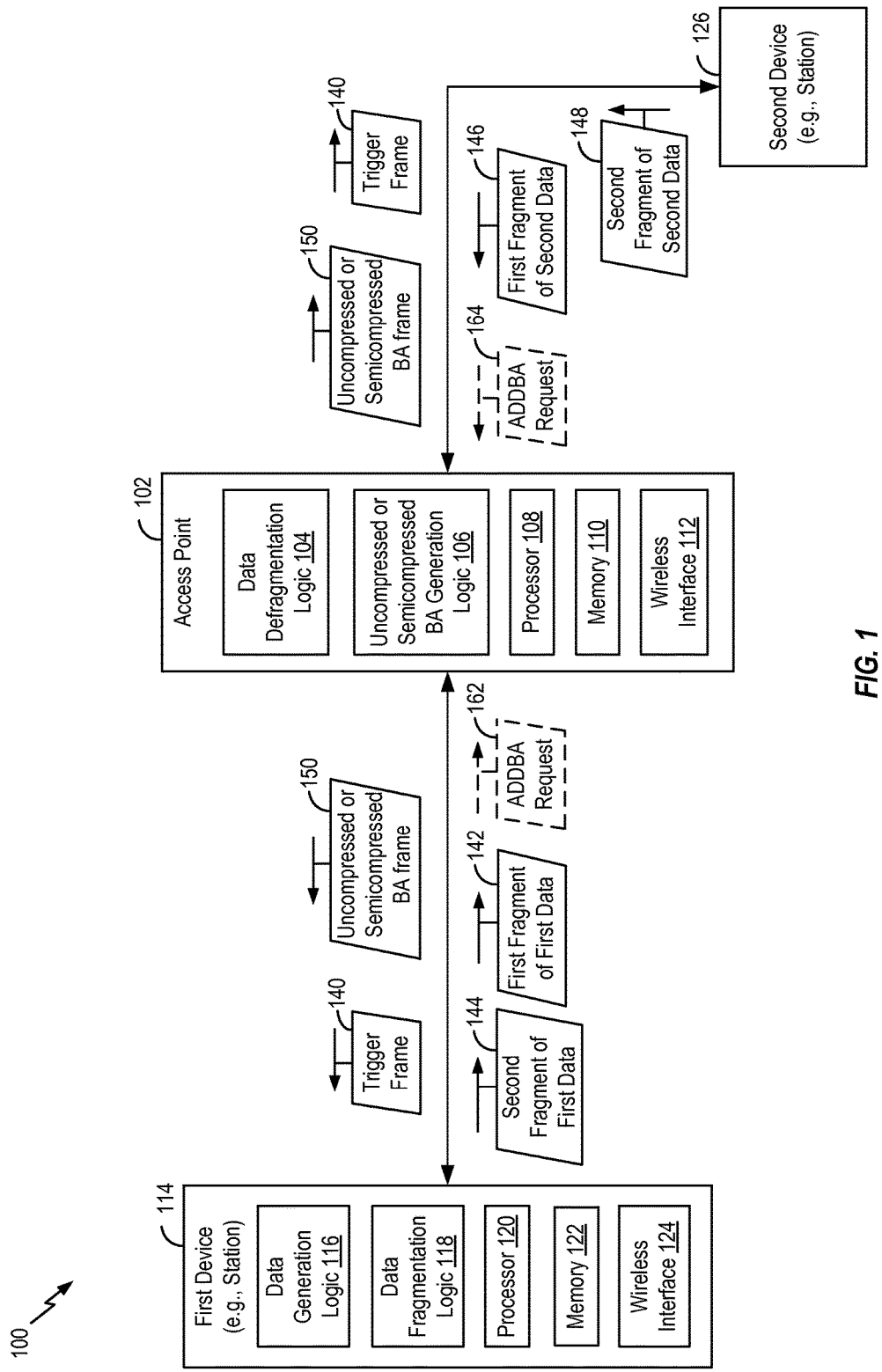
FIG. 1 is a diagram of a particular implementation of a wireless communication system that enables one or more devices to transmit data fragments during uplink transmission opportunities (TX_OPs)

Referring to FIG. 1, a particular implementation of a system 100, such as a wireless communication system that enables fragmentation of uplink (UL) data during UL transmission opportunities (TX_OPs) is shown. The system 100 may operate as a wireless local area network (WLAN) to enable devices of the system 100 to perform multi-user (MU) wireless communications between devices. The system 100 may implement an Institute of Electrical and Electronics Engineers (IEEE) 802.11 network, such as a "wi-fi" network, or a wireless network in accordance with other wireless communication protocols or standards.

The system 100 includes an access point 102 configured to perform wireless communications with a plurality of devices, such as a first device 114 and a second device 126. In a particular implementation, the devices 114 and 126 are stations. The system 100 illustrated in FIG. 1 is for convenience only. In other implementations, the system 100 may include different numbers and types of devices in different locations. For example, in an alternate implementation, functions of the access point 102 may be performed by one or more devices, such as stations, and the system 100 may function as a peer-to-peer network between devices. In a particular implementation, the access point 102 and the devices 114 and 126 implement a wireless network, such as a WLAN, in accordance with one or more IEEE 802.11 standards or protocols, such as the IEEE 802.11a, b, g, n, ac, ad, af, ah, ai, aj, aq, and ax standards.

The system 100 may support multi-user (MU) communications between multiple devices. The access point 102 and the devices 114 and 126 may each perform MU communications. For example, the access point 102 may transmit a single packet, such as a data packet, that is received by each of the devices 114 and 126. The single packet may include individual data portions directed to each of the devices 114 and 126. In a particular implementation, the access point 102 and the devices 114 and 126 each perform orthogonal frequency division multiple access (OFDMA) communications, and the packet is an OFDMA packet. In another particular implementation, the access point 102 and the devices 114 and 126 perform multiple input, multiple output (MIMO) communications, and the system 100 is a MU MIMO communication system.

The access point 102 may be configured to generate and transmit multiple access packets, including trigger frames, data packets, block acknowledgement (BA) frames, and other packets, to multiple devices of the system 100. In a particular implementation, the access point 102 includes a processor 108 (such as a central processing unit (CPU), a digital signal processor (DSP), a network processing unit (NPU), etc.), a memory 110 (such as a random access memory (RAM), a read-only memory (ROM), etc.), and a wireless interface 112 configured to send and receive data via a wireless network (such as via one or more wireless communication channels). The access point 102 may include multiple antennas and additional wireless interfaces (not shown) to enable MIMO communications. The access point 102 also includes data defragmentation logic 104 and block acknowledgement generation logic, such as uncompressed or semicompressed BA generation logic 106. Operations of the data defragmentation logic 104 and the uncompressed or semicompressed BA generation logic 106 are further described herein. In a particular implementation, the data defragmentation logic 104 and the uncompressed or semicompressed BA generation logic 106 are included in the processor 108. In another particular implementation, the data defragmentation logic 104 and the uncompressed or semicompressed BA generation logic 106 are external to the processor 108. In another particular implementation, the processor 108, executing instructions stored in the memory 110, performs the operations of the data defragmentation logic 104 and the uncompressed or semicompressed BA generation logic 106.

The access point 102, such as the processor 108, may be configured to schedule TX_OPs for multiple devices. For example, the access point 102 may schedule one or more TX_OPs of the first device 114 and the second device 126. The TX_OPs may be time periods, allocated to the devices 114 and 126 by the access point 102, during which the devices 114 and 126 are scheduled to transmit data via one or more wireless channels. The TX_OPs may include UL TX_OPs during which the devices 114 and 126 are scheduled to transmit UL data to the access point 102. For example, the first device 114 and the second device 126 may transmit data packets to the access point 102 (such as via OFDMA, MIMO, etc.) during a UL TX_OP. The access point 102 may be configured to generate a trigger frame 140 to enable the devices 114 and 126 to determine information related to corresponding TX_OPs. For example, the trigger frame 140 may include synchronization information and timing information that indicates starting times and durations of the one or more TX_OPs of with the first device 114 and the second device 126. The access point 102 may transmit the trigger frame 140 to the first device 114 and to the second device 126.

The devices 114 and 126 may each include a processor, such as a processor 120, a memory, such as a memory 122, and a wireless interface, such as a wireless interface 124. The devices 114 and 126 may include multiple antennas and additional wireless interfaces (not shown) to enable MIMO communications. The devices 114 and 126 may also each include data generation logic, such as data generation logic 116, and data fragmentation logic, such as data fragmentation logic 118. In a particular implementation, the data generation logic 116 and the data fragmentation logic 118 are included in the processor 120. In another particular implementation, the data generation logic 116 and the data fragmentation logic 118 are external to the processor 120. In another particular implementation, the processor 120, executing instructions stored in the memory 122, performs the operations of the data generation logic 116 and the data fragmentation logic 118.

The data generation logic 116 may be configured to generate UL data to be transmitted to the access point 102. For example, the data generation logic 116 of the first device 114 may generate first data (such as first UL data) for transmission from the first device 114 to the access point 102 during a first TX_OP of the first device 114 and the second device 126. The first TX_OP may be indicated by the trigger frame 140. The data generation logic 116, or the processor 120, or both, may also be configured to determine whether a "size" of the first data exceeds a "size" of the first TX_OP. For example, a threshold amount of data capable of being transmitted during a TX_OP may be determined based on a size (such as a duration) of the TX_OP and a modulation and coding scheme (MCS) used by a transmitting device. To illustrate, an MCS used by the first device 114 may correspond to (or may enable) a particular rate of data transmission, and the threshold amount of data may be determined based on the particular rate of data transmission and the duration of the first TX_OP. When the size of the first data does not exceed the size of the threshold amount of data (corresponding to the size of the first TX_OP), the first data may be transmitted from the wireless interface 124 to the access point 102 during the first TX_OP. When the size of the first data exceeds the threshold amount of data (corresponding to the size of the first TX_OP), the first data is provided to the data fragmentation logic 118.

The data fragmentation logic 118 may be configured to generate multiple data fragments based on the first data (such as to "fragment" or divide the first data). For example, the data fragmentation logic 118 may generate at least a first fragment 142 of the first data and a second fragment 144 of the first data. In a particular implementation, the data fragmentation logic 118 generates two data fragments. In another particular implementation, the data fragmentation logic 118 generates n data fragments, where n is an integer between two and sixteen. In other implementations, n may be a different number. The data fragmentation logic 118 may select the size of the data fragments based on the size of the corresponding TX_OP. For example, the data fragmentation logic 118 may divide the first data into the first fragment 142 having a size that does not exceed the threshold amount of data (corresponding to the size of the first TX_OP). Because the size of the first fragment 142 does not exceed the threshold amount of data, a first data packet that includes the first fragment 142 may be transmitted during the first TX_OP, and thus the first TX_OP is not unused (or wasted) by the first device 114. The second device 126 may similarly fragment data in order to transmit at least a data fragment to the access point 102 during the first TX_OP. Although transmission of data is described in an MU context, the data fragmentation may be performed on a per device, (e.g., station), basis.

The data fragmentation logic 118 generates the first data packet (based on the first fragment 142 of the first data) and causes the first data packet to be transmitted from the wireless interface 124 to the access point 102 during the first TX_OP. In addition, the data fragmentation logic 118 may generate a second data packet based on the second fragment 144 of the first data and may cause the second data packet (including the second fragment 144) to be transmitted from the wireless interface 124 to the access point 102 during a second TX_OP that is subsequent to the first TX_OP. In other implementations, the data fragmentation logic 118 determines that a size of a remainder of the first data (after the first fragment 142 is removed) exceeds a size of the second TX_OP (such as a second threshold amount of data corresponding to the size of the second TX_OP), and the data fragmentation logic 118 divides the remainder of the first data into the second fragment 144 and one or more other data fragments to be transmitted during one or more TX_OPs subsequent to the second TX_OP.

In a particular implementation, the size of the first fragment 142 and the size of the second fragment 144 may be the same. For example, the first data may be divided in half to form the first fragment 142 and the second fragment 144. In this example, a size of the first data packet and a size of the second data packet may be the same. In a particular implementation, the size of the first data packet and the size of the second data packet may be based on a "dot11FragmentationThreshold" (such as a threshold packet length) specified by an IEEE 802.11 standard. In another implementation, the size of the first data packet and the size of the second data packet are the same, but the size of the first fragment 142 and the size of the second fragment 144 are different. For example, the size of the first fragment 142 may be larger than the size of the second fragment 144. To maintain the same size for the first data packet and the second data packet, the second data packet may include padding (such as one or more null or zero bits) in addition to the second fragment 144, as further described with reference to FIG. 2. In other implementations, the size of the first data packet and the size of the second data packet are different, and the size of the first fragment 142 and the second fragment 144 are different, as further described with reference to FIGS. 3 and 4.

In a particular implementation, the first data packet and the second data packet may each include information (such as in a header) related to the corresponding data fragment. In a particular implementation, the information includes a sequence control field that includes a sequence identifier (ID) number, a fragment number, and a more fragments indicator. The sequence ID number may be a unique number that corresponds to the first data. For example, the first data packet (that includes the first fragment 142) and the second data packet (that includes the second fragment 144) may each indicate the same sequence ID number (indicating that the first fragment 142 and the second fragment 144 are data fragments of the same data). The fragment number may incremented to represent each fragment of the data corresponding to the sequence ID number. For example, the fragment number indicated by the first data packet may be one and the fragment number indicated by the second data packet may be two. The more fragments indicator may be a single bit having a first value when the corresponding data fragment is not a last fragment of the data corresponding to the sequence ID number (such as when more data fragments remain to be transmitted) and having a second value when the corresponding data fragment is the last fragment of the data (such as when no more data fragments remain to be transmitted). For example, when the first data is divided (or fragmented) into two data fragments, the more fragments indicator of the first data packet has the first value (indicating that the first fragment 142 is not the last fragment of the first data) and the more fragments indicator of the second data packet has the second value (indicating that the second fragment 144 is the last fragment of the first data). In a particular implementation, the information of the sequence control field (such as the sequence ID number, the fragment number, and the more fragments indicator) is formed in accordance with one or more protocols specified by an IEEE 802.11 standard for fragmenting DL data in single user, single access wireless networks.

In a particular implementation, the data fragmentation logic 118 may be configured to select one or more data fragmentation parameters (such as a number of data fragments m, a number of data units x, and a number of data fragments per data packet y) to be used to fragment the data and to transmit the data fragments. The data fragmentation logic 118 may communicate the data fragmentation parameters (such as m, x, and y) to the access point 102 in a block acknowledgement (BA) session request. The BA session request may be formed in accordance with an IEEE 802.11 standard. For example, the BA session request may be an IEEE 802.11ADDBA request. In another implementation, the access point 102 may determine the parameters m, x, and y and may provide the parameters m, x, and y for use by the devices, such as the first device 114 and the second device 126.

In order to process multiple data fragments, the access point 102 may include the data defragmentation logic 104. The data defragmentation logic 104 may be configured to receive multiple data fragments from the devices 114 and 126 and to defragment the multiple data fragments to form defragmented data. For example, the access point 102 may receive the first data packet (including the first fragment 142 of the first data) and the second data packet (including the second fragment 144 of the first data) from the first device 114 during different TX_OPs, such as during the first TX_OP and the second TX_OP. The access point 102 may provide the first fragment 142 and the second fragment 144 to the data defragmentation logic 104, and the data defragmentation logic 104 may perform defragmentation on the first fragment 142 and the second fragment 144 to defragment (or generate) the first data at the access point 102. For example, based on the information in the sequence control fields of the first data packet and the second data packet, the data defragmentation logic 104 may determine that the first fragment 142 and the second fragment 144 correspond to the same data (such as the first data) and the data defragmentation logic 104 may combine the first fragment 142 and the second fragment 144 to generate the first data. The first data may be provided to the processor 108 for processing.

In order to acknowledge receipt of the multiple data fragments, the access point 102 may include the uncompressed or semicompressed BA generation logic 106. The uncompressed or semicompressed BA generation logic 106 may be configured to generate an uncompressed or semicompressed BA frame 150 based on data fragments received from the devices 114 and 126. Illustrative uncompressed BA frames are described herein with reference to FIGS. 6 and 7. Illustrative semicompressed BA frames are described herein with reference to FIGS. 8 and 9. In a particular implementation, a format of the uncompressed or semicompressed BA frame 150 may be specified by an IEEE 802.11 standard.

The uncompressed or semicompressed BA frame 150 may include one or more uncompressed or semicompressed BA bitmaps to indicate receipt of multiple data fragments. As used herein, an uncompressed BA frame refers to a frame that includes an uncompressed BA bitmap. In some implementations, the uncompressed BA frame may have a format defined by a wireless communication standard, such as an IEEE 802.11 standard. As used herein, a semicompressed BA frame refers to a frame that includes a semicompressed BA bitmap. In some implementations, the semicompressed BA frame may have a format defined by a wireless communication standard, such as an IEEE 802.11 standard. A compressed BA bitmap includes a plurality of bits that indicate whether all of a plurality of data units (rather than fragments of data units) of a data unit sequence corresponding to the first device 114 have been received, successfully decoded, or both, by the access point 102. For example, for a data unit sequence having three data units, a compressed BA bitmap includes three bits, and each bit of the compressed BA bitmap indicates whether a corresponding data unit of the plurality of data units has been received, decoded, or both. The uncompressed BA bitmap indicates whether each data fragment of the plurality of data units has been received, as compared to the compressed BA bitmap, which indicates whether each data unit of the plurality of data units has been received. A semicompressed BA bitmap may include a plurality of bits indicating whether one or more data fragments, but not all data fragments, of the plurality of data units have been received by the access point 102. As compared to a compressed BA bitmap, the semicompressed BA bitmap indicates one or more data fragments that have been received, rather than indicating only data units. As compared to the uncompressed BA bitmap, the semicompressed BA bitmap does not indicate whether each data fragment of all of the plurality of data units has been received, and the semicompressed BA bitmap may be smaller than the uncompressed BA bitmap, as further described herein.

A first uncompressed BA bitmap may include a plurality of bits indicating whether each data fragment of a plurality of data units of a data unit sequence corresponding to the first device 114 have been received, successfully decoded, or both, by the access point 102. The uncompressed or semicompressed BA generation logic 106 may set a value of each bit of the first uncompressed BA bitmap based on received data fragments from the first device 114. For example, a first bit of the first uncompressed BA bitmap may have a first value when the first fragment 142 has been received by the access point 102 and the first bit may have a second value when first fragment 142 has not been received by the access point 102. As non-limiting examples, the first fragment 142 may not be received because the first fragment 142 did not reach the access point 102 or because the first fragment 142 was corrupted during transmission. A value of a second bit of the first uncompressed BA bitmap may be set based on whether the second fragment 144 has been received at the access point 102. In other examples, other bits may correspond to other fragments of the first data, and other sets of bits may correspond to one or more fragments of other data units received at the access point 102 from the first device 114.

A semicompressed BA bitmap may include a plurality of bits indicating whether one or more data fragments, but not all data fragments, of the plurality of data units have been received by the access point 102. The semicompressed BA bitmap may also indicate one or more non-fragmented data units received by the access point 102. If the number of data fragments per data unit is limited (such as one or two), a number of bits used to identify the received data fragments may be less than a number of bits used to represent the uncompressed BA bitmap. For example, the uncompressed BA bitmap may include a corresponding bit to indicate receipt of each of a threshold (such as a maximum) number of data fragments for each data unit, which may use more bits than indicating one or more non-fragmented data units and a few (such as one or two) data fragments, as in the semicompressed BA bitmap.

In a particular implementation, the uncompressed or semicompressed BA frame 150 includes multiple uncompressed or semicompressed BA bitmaps corresponding to multiple devices. For example, the uncompressed or semicompressed BA frame 150 may include the first uncompressed or semicompressed BA bitmap corresponding to the first device 114 and a second uncompressed or semicompressed BA bitmap corresponding to the second device 126. In this implementation, the uncompressed or semicompressed BA frame 150 is transmitted from the access point 102 to both the first device 114 and the second device 126. Each of the first device 114 and the second device 126 may be configured to receive the uncompressed or semicompressed BA frame 150 and to determine whether previously transmitted data fragments have been received by the access point 102. Based on a determination that at least one previously transmitted data fragment has not been received by the access point 102, the first device 114 and the second device 126 may retransmit the at least one previously transmitted data fragment. For example, the first device 114 may determine whether a bit of the first uncompressed or semicompressed BA bitmap corresponding to the first fragment 142 has the second value (such as indicating that the first fragment 142 was not received by the access point 102). When the particular bit has the second value, the first device 114 (such as via the data fragmentation logic 118, the processor 120, or both) may generate a third data packet that includes the first fragment 142 and may transmit the third data packet to the access point 102.

In an alternate implementation, the uncompressed or semicompressed BA frame 150 includes a single uncompressed or semicompressed BA bitmap (such as the first BA bitmap). In this implementation, the uncompressed or semicompressed BA frame 150 is transmitted from the access point 102 to the first device 114 and not to the second device 126. A second uncompressed or semicompressed BA frame that includes a second uncompressed or semicompressed BA bitmap corresponding to the second device 126 may be generated and transmitted from the access point 102 to the second device 126 and not to the first device 114. In this implementation, additional uncompressed or semicompressed BA frames are generated for each additional device of the system 100.

During operation, the access point 102 may generate and transmit the trigger frame 140 to each of the devices 114 and 126. In a particular implementation, the trigger frame 140 indicates a single TX_OP of the devices, such as the first TX_OP. In an alternate implementation, the trigger frame 140 indicates one or more TX_OPs of the devices, such as the first TX_OP and the second TX_OP. In some implementations, the first device 114 may transmit a first ADDBA request 162 to the access point 102 to indicate one or more data fragmentation parameters used by the first device 114, and the second device 126 may transmit a second ADDBA request 164 to the access point 102 to indicate one or more data fragmentation parameters used by the second device 126, as described with reference to FIGS. 8 and 9. The ADDBA requests 162 and 164 may be optional, and may not be used in other implementations. For example, the data fragmentation parameters may be stored in the memory 110 during manufacturing of the access point 102 or may be communicated via other messages.

The first device 114 may determine that the size of the first data exceeds size of the first TX_OP (such as the threshold amount of data corresponding to the size of the first TX_OP) and may generate the first data packet including the first fragment 142 and the second data packet including the second fragment 144. The first device 114 may transmit the first data packet and the second data packet to the access point 102 during the first TX_OP and the second TX_OP, respectively. Additionally, the second device 126 may determine that the size of second data exceeds a size of the first TX_OP (such as the threshold amount of data corresponding to the size of the first TX_OP) and may generate a third data packet including a first fragment 146 of the second data and a fourth data packet including a second fragment 148 of the second data. The second device 126 may transmit the third data packet and the fourth data packet to the access point 102 during the first TX_OP and the second TX_OP, respectively.

After at least one transmission by at least one of the devices 114 and 126, the access point 102 may generate the uncompressed or semicompressed BA frame 150 based on one or more received data fragments. For example, the first TX_OP may occur before the second TX_OP. After the first TX_OP, the access point 102 may set one or more bits of a first uncompressed or semicompressed BA bitmap included in the uncompressed or semicompressed BA frame 150 to indicate whether the first fragment 142 of the first data has been received. In a particular implementation, the access point 102 also sets one or more bits of a second uncompressed or semicompressed BA bitmap included in the uncompressed or semicompressed BA frame 150 to indicate whether the first fragment 146 of the second data has been received. In this implementation, the access point 102 transmits the uncompressed or semicompressed BA frame 150 to the first device 114 and to the second device 126. Additionally, the access point 102 may generate a second uncompressed or semicompressed BA frame after the second TX_OP and the access point 102 may transmit the second uncompressed or semicompressed BA frame to the first device 114 and to the second device 126. In an alternate implementation, the access point 102 transmits the uncompressed or semicompressed BA frame 150 to the first device 114 and generates and transmits a second uncompressed or semicompressed BA frame to the second device 126. In this implementation, one or more bits of the first uncompressed or semicompressed BA bitmap in the uncompressed or semicompressed BA frame 150 indicate whether the first fragment 142 of the first data has been received by the access point 102 and one or more bits of a second uncompressed or semicompressed BA bitmap of the second uncompressed or semicompressed BA frame indicate whether the first fragment 146 of the second data has been received by the access point 102.

The system 100 may thus provide for fragmentation of UL data transmitted from devices to an access point of a MU wireless communication system, such as a system that implements an IEEE 802.11 wireless network. Because the UL data is fragmented, a data fragment having a smaller size than an entirety of the UL data may be transmitted when a total size of the UL data exceeds a size of a UL TX_OP, such as a threshold amount of data corresponding to the size of the UL TX_OP. One or more other fragments of the UL data may be transmitted during one or more subsequent UL TX_OPs to complete transmission of the UL data. In this manner, the device may transmit a portion (such as a fragment) of UL data during a UL TX_OP that does not have a sufficient duration to transmit an entirety of the UL data, and the UL TX_OP is not unused. Reducing unused UL TX_OPs reduces latency and increases efficiency of the wireless communication system.

Figure 2:
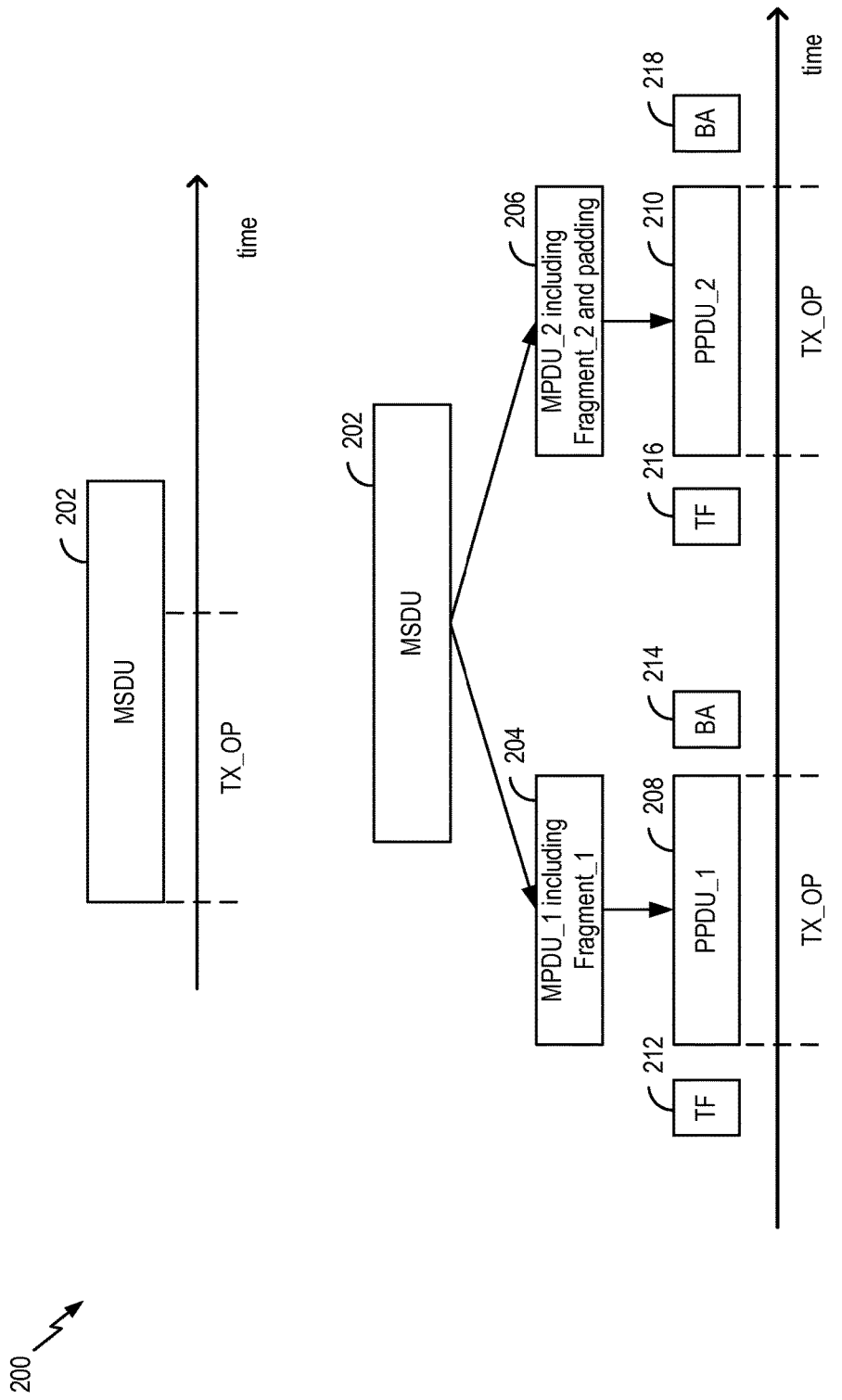
FIG. 2 is a timing diagram of a first implementation of fragmenting uplink data for transmission during multiple uplink TX_OPs.

Referring to FIG. 2, a first timing diagram 200 illustrating fragmenting uplink data for transmission during multiple uplink TX_OPs is shown. In an illustrative implementation, the fragmentation of data may be performed by the data fragmentation logic 118 of the first device 114 and transmission of data fragments may occur during the first TX_OP and the second TX_OP, as described with reference to FIG. 1.

In a particular implementation, fragmentation of UL data occurs at a MAC layer, and not at the physical (PHY) layer. For example, UL data to be fragmented may include one or more MSDUs. After fragmentation, other information, such as headers, preambles, or both, may be prepended to the MSDUs (or fragments of MSDUs) to form physical layer convergence protocol (PLCP) data units (PPDUs). In some implementations, PPDUs may be referred to as data packets or physical layer packets. For example, the first data packet and the second data packet described with reference to FIG. 1 may be PPDUs. Each PPDU may include a preamble and a payload. The payload may include a MAC header, data for other layers, UL data, or a combination thereof, for example. In various implementations, data units included in the payload may include a MPDU, A-MPDUs (such as one or more MPDUs aggregated together), or a combination thereof. The MPDUs may include the MSDUs (or fragments of MSDUs), as further described herein.

As shown in FIG. 2, the UL data includes a MSDU 202. The MSDU 202 may correspond to the first data described with reference to FIG. 1. As shown in FIG. 2, a size of the MSDU 202 may exceed the size of the first TX_OP. In order for the first TX_OP to be used for UL data transmission (instead of going unused), the MSDU 202 may be fragmented (or divided) into Fragment_1 and Fragment_2, corresponding to the first fragment 142 and the second fragment 144, respectively, of FIG. 1.

To illustrate, the first TX_OP may have a size x. Although described as a size of the first TX_OP, x may refer to the threshold amount of data capable of being transmitted during the first TX_OP, such as based on a MCS used by the first device 114, as described with reference to FIG. 1. When the size of the MSDU 202 does not exceed x, the MSDU 202 may be transmitted during the first TX_OP and fragmentation of the MSDU 202 does not occur. When the size of the MSDU 202 exceeds x, the MSDU 202 may be fragmented. For example, the MSDU 202 may be divided into Fragment_1 having a size that does not exceed x, and Fragment_2. In a particular implementation, the size of Fragment_1 is also selected based on a threshold packet length (such as the dot11FragmentationThreshold specified by an IEEE 802.11 standard). For example, when x does not exceed the threshold packet length, the size of Fragment_1 may be x. When x exceeds the threshold packet length, the size of Fragment_1 may be less than x and less than or equal to the threshold packet length. In other implementations, the size of Fragment_1 is based on x and not on the threshold packet length.

After fragmenting (or dividing) the MSDU 202 into Fragment_1 and Fragment_2, the data fragments may be "packed" (such as included) in corresponding MPDUs, which may be "packed" (such as included) in corresponding PPDUs and transmitted during corresponding TX_OPs. To illustrate, a first MPDU 204 (MPDU_1) may be generated (or formed) based on Fragment_1. For example, the first MPDU 204 may include a MAC header and Fragment_1. A first PPDU 208 (PPDU_1) may be generated (or formed) based on the first MPDU 204. For example, the first PPDU 208 may include a preamble and a payload that includes the first MPDU 204. In an illustrative implementation, the first data packet described with reference to FIG. 1 corresponds to the first PPDU 208. Additionally, a second MPDU 206 (MPDU_2) may be generated (or formed) based on Fragment_2. For example, the second MPDU 206 may include a MAC header and Fragment_2. A second PPDU 210 (PPDU_2) may be generated (or formed) based on the second MPDU 206. For example, the second PPDU 210 may include a preamble and a payload that includes the second MPDU 206. In an illustrative implementation, the second data packet described with reference to FIG. 1 corresponds to the second PPDU 210.

As shown in FIG. 2, the first device 114 receives a first trigger frame 212 (corresponding to the trigger frame 140 of FIG. 1) from the access point 102. The first trigger frame 212 may include timing information corresponding to the first TX_OP. During the first TX_OP, the first device 114 transmits the first PPDU 208 to the access point 102. The first device 114 receives a first BA frame 214 from the access point 102 based on transmitting the first PPDU 208. In one example, the first BA frame 214 is an uncompressed or semicompressed BA frame, such as the uncompressed or semicompressed BA frame 150 of FIG. 1. Subsequent to receiving the first BA frame 214, the first device 114 receives a second trigger frame 216 from the access point 102. The second trigger frame 216 may include timing information corresponding to the second TX_OP. During the second TX_OP, the first device 114 transmits the second PPDU 210 to the access point 102. The first device 114 receives a second BA frame 218 from the access point 102 based on transmitting the first PPDU 208. In one example, the second BA frame 218 is an uncompressed or semicompressed BA frame.

In a particular implementation, the size of the first TX_OP and the size of the second TX_OP are the same, and a size of the first PPDU 208 and the second PPDU 210 are the same. However, the size of Fragment_1 may exceed the size of Fragment_2. In this implementation, the payload of the second MPDU 206 includes Fragment_2 and further includes padding. For example, the payload of the second MPDU 206 may include Fragment_2 and one or more null bits such that a size of the second MPDU 206 is the same as a size of the first MPDU 204. In another particular implementation, the MSDU 202 may be fragmented into Fragment_1, one or more intermediate fragments, and Fragment_2 (such as Fragment_2 may be the last fragment of the MSDU 202). In this implementation, sizes of the one or more intermediate fragments are the same as the size of Fragment_1, and only Fragment_2 (such as the last fragment) is padded when included in the second MPDU 206.

In another particular implementation, the size of the first TX_OP and the size of the second TX_OP are different. In this implementation, the size of Fragment_2 is selected based on the size of the second TX_OP, and the size of the first PPDU 208 and the second PPDU 210 (such as the first data packet and the second data packet of FIG. 1) may be different based on the different sizes of the TX_OPs. Because the PPDUs 208 and 210 may be different sizes, the second TX_OP having a smaller size than the first TX_OP does not result in the second TX_OP being unused.

Although FIG. 2 illustrates UL data transmission for a single device (such as the first device 114), such illustration is not intended to be limiting. For example, other device(s) (such as the second device 126) may similarly fragment UL data and transmit data packets (including at least one data fragment) to the access point 102 during the first TX_OP, during the second TX_OP, or both. Multiple devices (such as the first device 114 and the second device 126) may transmit data packets to the access point 102 via MU communications (such as OFDMA, MIMO, etc.).

Figure 3:
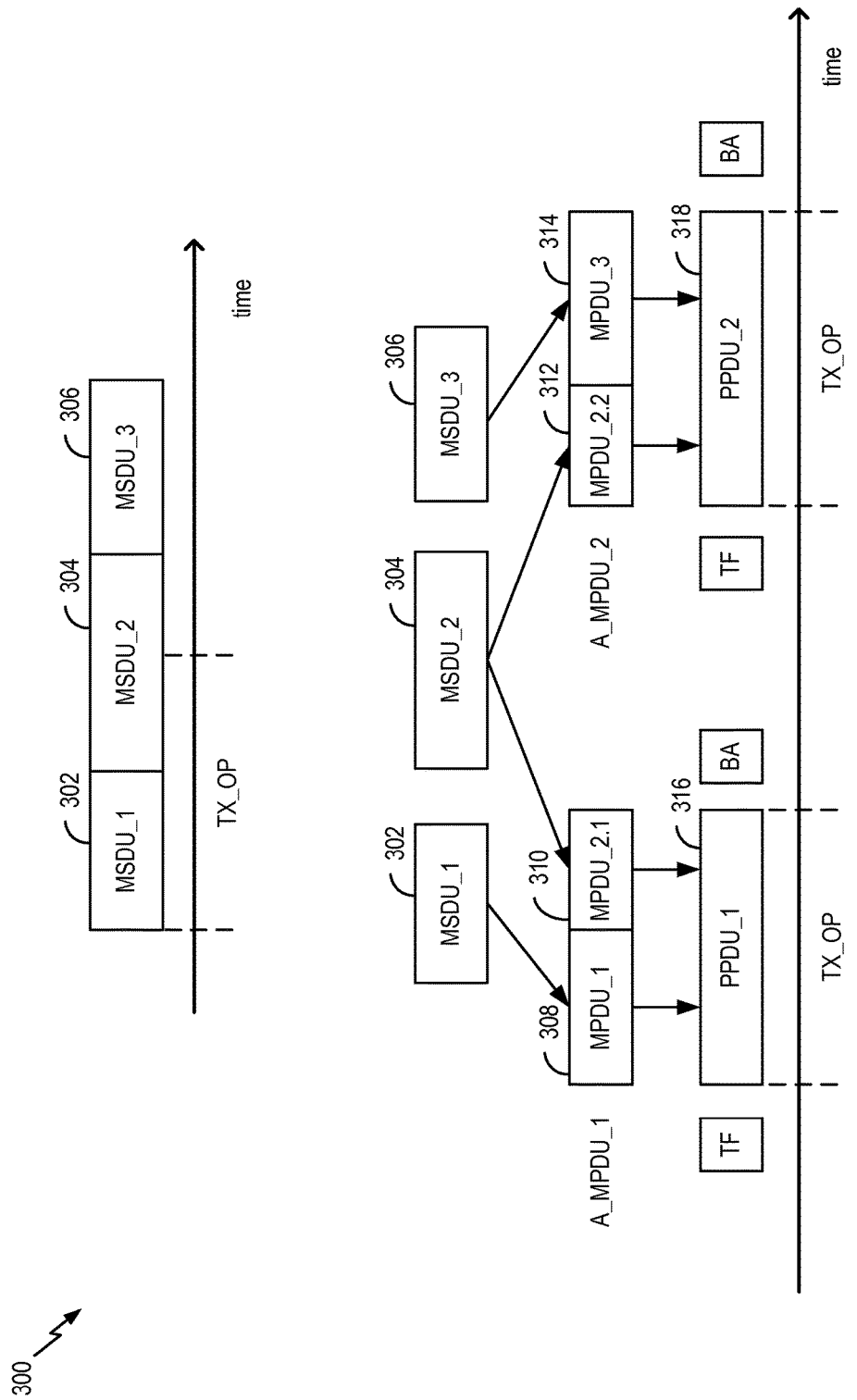
FIG. 3 is a timing diagram of a second implementation of fragmenting uplink data for transmission during multiple uplink TX_OPs.

Referring to FIG. 3, a second timing diagram 300 illustrating fragmenting uplink data for transmission during multiple uplink TX_OPs is shown. In an illustrative implementation, the fragmentation of data may be performed by the data fragmentation logic 118 of the first device 114 and transmission of data fragments may occur during the first TX_OP and the second TX_OP, as described with reference to FIG. 1.

FIG. 3 illustrates an example of data fragmentation where the first data described with reference to FIG. 1 includes multiple MSDUs. For example, the first data may include a first MSDU 302 (MSDU_1), a second MSDU 304 (MSDU_2), and a third MSDU 306 (MSDU_3). As shown in FIG. 3, a size of the first MSDU 302 does not exceed the size of the first TX_OP. However, a combined size of the first MSDU 302, the second MSDU 304, and the third MSDU 306 exceeds the size of the first TX_OP.

In order to efficiently use each TX_OP, the data fragmentation logic 118 may pack (or include) one or more MSDUs and a fragment of a different MSDU in a PPDU for transmission during a corresponding TX_OP. For example, the first TX_OP may have a size x. The data fragmentation logic 118 may determine that the size of the first MSDU 302 does not exceed x and may generate (or form) a first MPDU 308 (MPDU_1) based on the first MSDU 302, such as the first MPDU 308 may include a MAC header and the first MSDU 302. The data fragmentation logic 118 may determine a remainder of the TX_OP, such as by computing a difference between x and the size of the first MPDU 308. When a size of a next MSDU to be packed does not exceed a size of the remainder of the TX_OP, the next MSDU may be packed into an MPDU, and the size of the remainder of the TX_OP may be updated. When the size of the next MSDU to be packed exceeds the size of the remainder of TX_OP, the data fragmentation logic 118 may fragment the next MSDU. For example, the second MSDU 304 may be divided such that a size of a first fragment of the second MSDU 304 does not exceed the size of the remainder of the first TX_OP. A second MPDU 310 (MPDU_2.1) may be generated (or formed) based on the first fragment of the second MSDU 304 (such as the second MPDU 310 may include a MAC header and the first fragment of the second MSDU). The first MPDU 308 and the second MPDU 310 may be aggregated together to form a first A-MPDU (A_MPDU_1). A first PPDU 316 may be generated (or formed) based on the first A-MPDU (such as the first PPDU 316 may include a preamble and a payload including A_MPDU_1) and may be transmitted to the access point 102 during the first TX_OP.

Additionally, a third MPDU 312 (MPDU_2.2) may be generated (or formed) based on a second fragment of the second MSDU 304 and a fourth MPDU 314 (MPDU_3) may be generated (or formed) based on the third MSDU 306. For example, the third MPDU 312 may include a MAC header and the second fragment of the second MSDU 304, and the fourth MPDU 314 may include a MAC header and the third MSDU 306. The third MPDU 312 and the fourth MPDU 314 may be aggregated together to form a second A-MPDU (A_MPDU_2). A second PPDU 318 may be generated (or formed) based on the second A-MPDU (such as the second PPDU may include a preamble and a payload including A_MPDU_2) and may be transmitted to the access point 102 during the second TX_OP. In this manner, a PPDU transmitted from the first device 114 to the access point 102 may include at least one complete MSDU and a fragment of a different MSDU.

Although FIG. 3 illustrates UL data transmission for a single device (such as the first device 114), such illustration is not intended to be limiting. For example, other device(s) (such as the second device 126) may similarly fragment UL data and transmit data packets (including at least one data fragment) to the access point 102 during the first TX_OP, during the second TX_OP, or both. Multiple devices (such as the first device 114 and the second device 126) may transmit data packets to the access point 102 via MU communications (such as OFDMA, MIMO, etc.).

Figure 4:
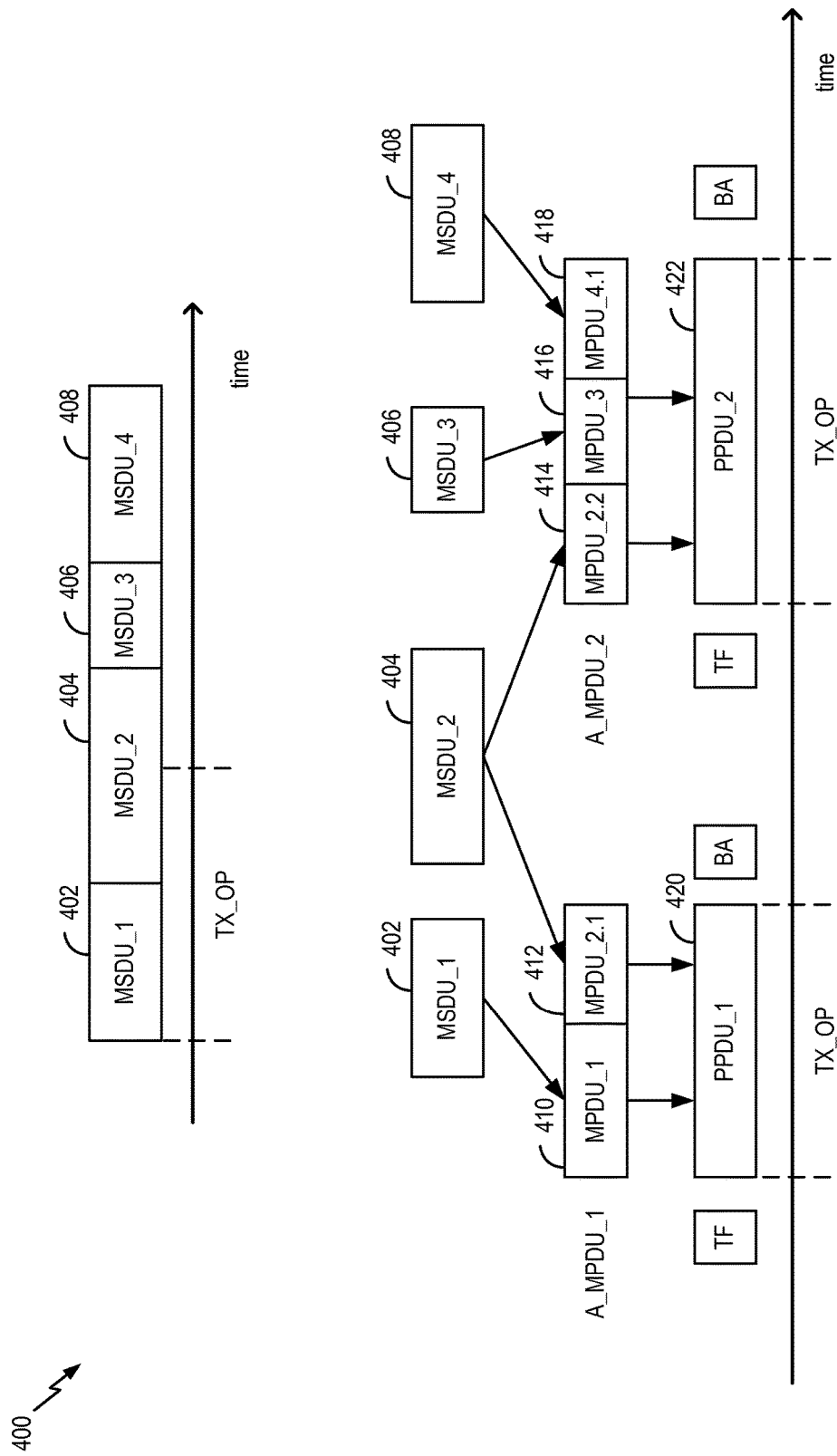
FIG. 4 is a timing diagram of a third implementation of fragmenting uplink data for transmission during multiple uplink TX_OPs.

FIG. 4 illustrates an example of data fragmentation where multiple fragments of different MSDUs are packed (or included) in a single PPDU. In an illustrative implementation, first data (such as UL data corresponding to the first data of FIG. 1) includes a first MSDU 402 (MSDU_1), a second MSDU 404 (MSDU_2), a third MSDU 406 (MSDU_3), and a fourth MSDU 408 (MSDU_4). As shown in FIG. 4, a size of the first MSDU 402 does not exceed the size of the first TX_OP. However, a combined size of the first MSDU 402, the second MSDU 404, the third MSDU 406, and the fourth MSDU 408 exceeds the size of the first TX_OP.

In order to efficiently use each TX_OP, the data fragmentation logic 118 may include one or more complete MSDUs and one or more fragments of MSDU(s) into a PPDU for transmission during a corresponding TX_OP. For example, the first TX_OP may have a size x. The data fragmentation logic 118 may determine that the size of the first MSDU 402 does not exceed x and may generate (or form) a first MPDU 410 (MPDU_1) based on the first MSDU 402, such as the first MPDU 410 may include a MAC header and the first MSDU 402. The data fragmentation logic 118 may determine a remainder of the TX_OP, for example by computing a difference between x and the size of the first MSDU 402. When the size of the second MSDU 404 exceeds a size of the remainder of TX_OP, the data fragmentation logic 118 may fragment the second MSDU 404 into two fragments. The second MSDU 404 may be divided such that a size of a first fragment of the second MSDU 404 does not exceed the remainder of the first TX_OP. A second MPDU 412 (MPDU_2.1) may be generated (or formed) based on the first fragment of the second MSDU 404, such as the second MPDU 412 may include a MAC header and the first fragment of the second MSDU 404. The first MPDU 410 and the second MPDU 412 may be aggregated together to form a first A-MPDU (A_MPDU_1). A first PPDU 420 may be generated (or formed) based on the first A-MPDU (such as the first PPDU 420 may include a preamble and a payload including A_MPDU_1) and may be transmitted to the access point 102 during the first TX_OP.

The second TX_OP may have a size y that is different than the size x of the first TX_OP. However, a size of the remainder of the data (such as the second fragment of the second MSDU 404, the third MSDU 406, and the fourth MSDU 408) may exceed y. To efficiently use the second TX_OP, the data fragmentation logic 118 may pack (such as include) multiple data fragments in a PPDU to be transmitted during the second TX_OP. To illustrate, a third MPDU 414 (MPDU_2.2) may be generated (or formed) based on a second fragment of the second MSDU 404 and a fourth MPDU 416 (MPDU_3) may be generated (or formed) based on the third MSDU 406. For example, the third MPDU 414 may include a MAC header and the second fragment of the second MSDU 404, and the fourth MPDU 416 may include a MAC header and the third MSDU 406.

Additionally, the fourth MSDU 408 may be fragmented (or divided) into two (or more) data fragments. The fourth MSDU 408 may be divided such that a size of a first fragment of the fourth MSDU 408 does not exceed a remaining size of the second TX_OP, such as a remainder of the second TX_OP after the second fragment of the second MSDU 404 and the third MSDU 406 are transmitted. A fifth MPDU 418 (MPDU_4.1) may be generated (or formed) based on the first fragment of the fourth MSDU 408 (such as the fifth MPDU 418 may include a MAC header and the first fragment of the fourth MSDU 408). The third MPDU 414, the fourth MPDU 416, and the fifth MPDU 418 may be aggregated together to form a second A-MPDU (A_MPDU_2). A second PPDU 422 may be generated (or formed) based on the second A-MPDU (such as the second PPDU 422 may include a preamble and a payload including A_MPDU_2) and may be transmitted to the access point 102 during the second TX_OP. Remaining fragment(s) of the fourth MSDU 408 may be transmitted during subsequent TX_OP(s). In a particular implementation, the first MPDU (such as the third MPDU 414) and the last MPDU (such as the fifth MPDU 418) in a PPDU are capable of including fragments of MSDUs, and intermediate MPDUs (such as the fourth MPDU 416) do not include fragments of MSDUs. In this manner, a PPDU transmitted from the first device 114 to the access point 102 may include multiple fragments of different MSDUs.

Although FIG. 4 illustrates UL data transmission for a single device (such as the first device 114), such illustration is not intended to be limiting. For example, other device(s) (such as the second device 126) may similarly fragment UL data and transmit data packets (including multiple data fragments) to the access point 102 during the first TX_OP, during the second TX_OP, or both. Multiple devices (such as the first device 114 and the second device 126) may transmit data packets to the access point 102 via MU communications (such as OFDMA, MIMO, etc.).

Figure 5:
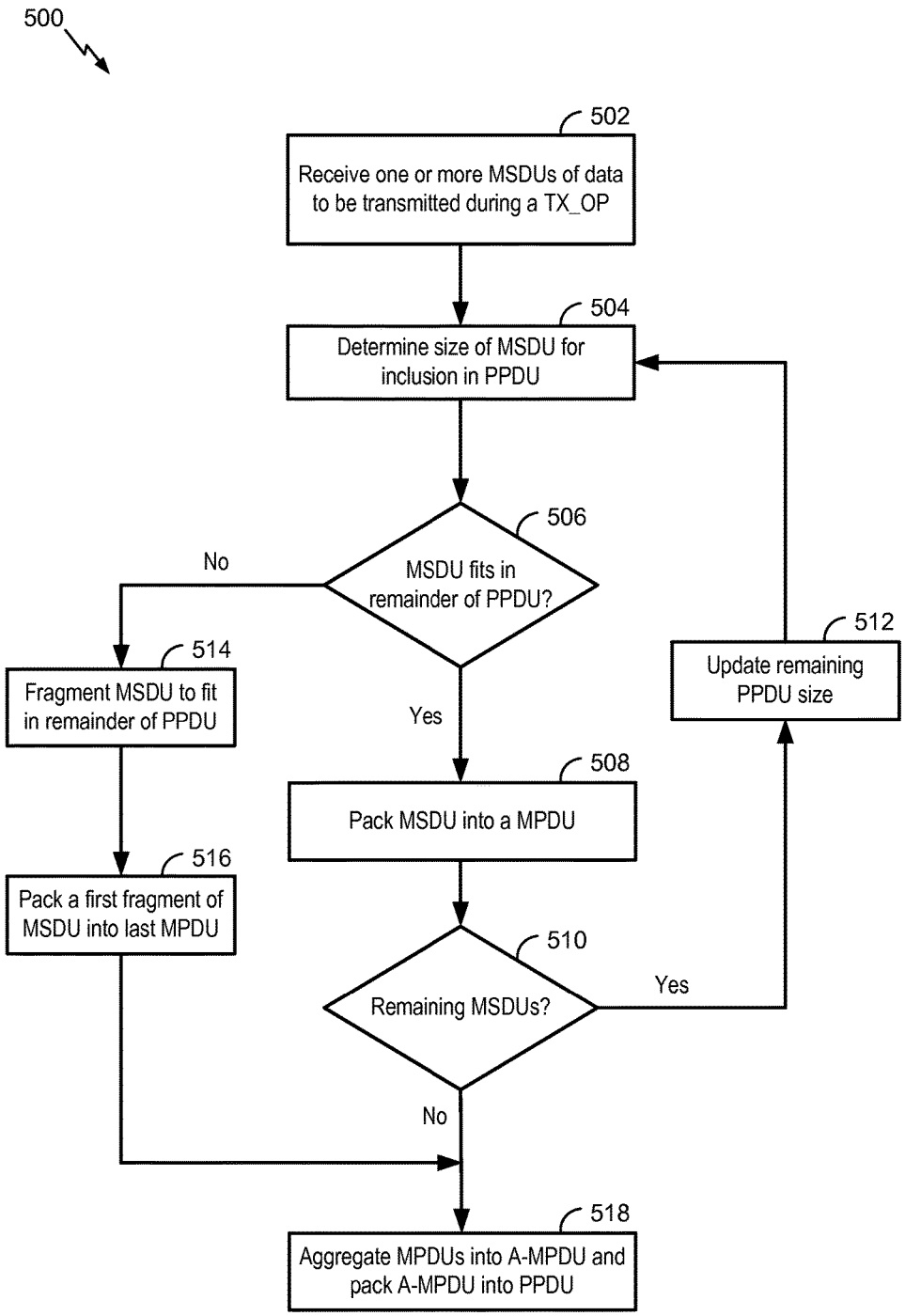
FIG. 5 is a flow diagram of an illustrative method of operation of data fragmentation logic (or a data fragmentation engine) for fragmenting uplink data.

Referring to FIG. 5, an illustrative method 500 of performing fragmentation of UL data is shown. In an illustrative implementation, the method 500 is performed by the data fragmentation logic 118 of the first device 114 of FIG. 1. In another particular implementation, a fragmentation engine or module is stored in the memory 122 of the first device 114 of FIG. 1, and is executable by the processor 120 to perform steps of the method 500.

The method 500 includes receiving one or more MSDUs of data to be transmitted during a TX_OP, at 502. For example, one or more MSDUs of UL data may be queued and provided to the data fragmentation logic 118. The method 500 includes determining a size of a MSDU for inclusion in a PPDU, at 504. For example, the PPDU may correspond to a data packet to be transmitted to the access point 102 of FIG. 1 during the TX_OP. The PPDU may be selected to have a largest threshold size capable of being transmitted during the TX_OP.

The method 500 includes determining whether the MSDU fits in a remainder of a PPDU, at 506. For example, the data fragmentation logic 118 may compare the size of the MSDU to a remaining size of the PPDU (such as the difference between the threshold size and sizes of any MPDUs already "packed" into the PPDU) to determine whether the MSDU fits in the PPDU.

When the MSDU fits in the PPDU, the method 500 continues to 508, where the MSDU is packed into a PPDU. The method 500 includes determining whether any MSDUs remain to be packed (or included) in the PPDU, at 510. When at least one MSDU remains, the remaining PPDU size is updated (such as a difference between the previous remaining PPDU size and the size of the MPDU including the MSDU is determined), at 512, and the method returns to 504, where a size of a next MPDU for inclusion in the PPDU is determined. When no MSDUs remain, the method 500 continues to 518.

When the MSDU does not fit in the PPDU (as determined at 506), the method 500 continues to 514, where the MSDU is fragmented to fit in a remainder of the PPDU. For example, the MSDU may be fragmented (or divided) into multiple fragments including a first fragment that is sized to fit in the remainder of the PPDU. The method 500 includes packing a first fragment of the MSDU into a last MPDU, at 516. The method 500 then continues to 518.

The method 500 includes aggregating the MPDU(s) into an aggregated MPDU (A-MPDU) and packing the A-MPDU into the PPDU, at 518. For example, one or more MPDUs including one or more MSDUs, one or more fragments of MPDUs, or a combination thereof, are aggregated into a single A-MPDU, and the A-MPDU is packed into the PPDU (such as the A-MPDU is included in a payload of the PPDU). The PPDU is transmitted to the access point 102 during the TX_OP. If additional data remains in the queue after generation and transmission of the PPDU, one or more additional PPDUs may be generated using the method 500 for transmission during one or more subsequent TX_OPs.

To illustrate performance of the method 500, the operations of the method 500 are described with reference to the illustrative implementation of FIG. 4. The MSDUs 402-408 are queued and provided to the data fragmentation logic 118. The data fragmentation logic 118 compares a size of the first MSDU 402 to a size of the first PPDU 420 (having a threshold size that does not exceed the size of the first TX_OP). Based on a determination that the first MSDU 402 fits in the first PPDU 420, the first MSDU 402 is packed into the first MPDU 410. In one aspect, the determination that the first MSDU 402 fits in the first PPDU 420 may be based on the comparison of the size of the first MSDU 402 to the size of the first PPDU 420. The size of a remainder of the first PPDU 420 is updated based on the size of the first MPDU 410, and the data fragmentation logic 118 determines whether the second MSDU 404 fits in the remainder of first PPDU 420. Based on a determination that the second MSDU 404 does not fit in the remainder of the first PPDU 420, the second MSDU 404 is fragmented, a first fragment of the second MSDU 404 is generated (the first fragment having a size that fits in the remainder of the first PPDU 420), and the first fragment of the second MSDU is packed into the second MPDU 412. The first MPDU 410 and the second MPDU 412 are aggregated into A-MPDU_1, A-MPDU_1 is packed into the first PPDU 420, and the first PPDU 420 is transmitted to the access point 102 during the first TX_OP.

After transmission of the first PPDU 420 (and receipt of a first BA frame), the second fragment of the second MSDU 404, the third MSDU 406, and the fourth MSDU 408 remain in the queue for potential fragmentation and for transmission. The data fragmentation logic 118 compares a size of the second fragment of the second MSDU 404 to a size of the second PPDU 422 (having a threshold size that does not exceed the size of the second TX_OP).

Based on a determination that the second fragment of the second MSDU 404 fits in the second PPDU 422, the second fragment of the second MSDU 404 is packed into the third MPDU 414. In one aspect, the determination that the second fragment of the second MSDU 404 fits in the second PPDU 422 may be based on the comparison of the second MSDU 404 and the second PPDU 422. The size of a remainder of the second PPDU 422 is updated based on the size of the third MPDU 414, and the data fragmentation logic 118 determines whether the third MSDU 406 fits in the remainder of second PPDU 422. Based on a determination that the third MSDU 406 fits in the remainder of the second PPDU 422, the third MSDU 406 is packed into the fourth MPDU 416. The size of the remainder of the second PPDU 422 is updated based on the size of the fourth MPDU 416, and the data fragmentation logic 118 determines whether the fourth MSDU 408 fits in the second PPDU 422.

Based on a determination that the fourth MSDU 408 does not fit in the remainder of the second PPDU 422, the fourth MSDU 408 is fragmented, a first fragment of the fourth MSDU 408 is generated (the first fragment having a size that fits in the remainder of the second PPDU 422), and the first fragment of the fourth MSDU is packed into the fifth MPDU 418. The third MPDU 414, the fourth MPDU 416, and the fifth MPDU 418 are aggregated into A-MPDU_2, A-MPDU_2 is packed into the second PPDU 422, and the second PPDU 422 is transmitted to the access point 102 during the second TX_OP. Remaining fragment(s) of the fourth MSDU 408 are transmitted during subsequent TX_OP(s). Thus, the method 500 enables efficient use of TX_OPs by enabling up to two fragments of different MSDUs to be included in a single PPDU transmitted during a TX_OP.

Figure 6:
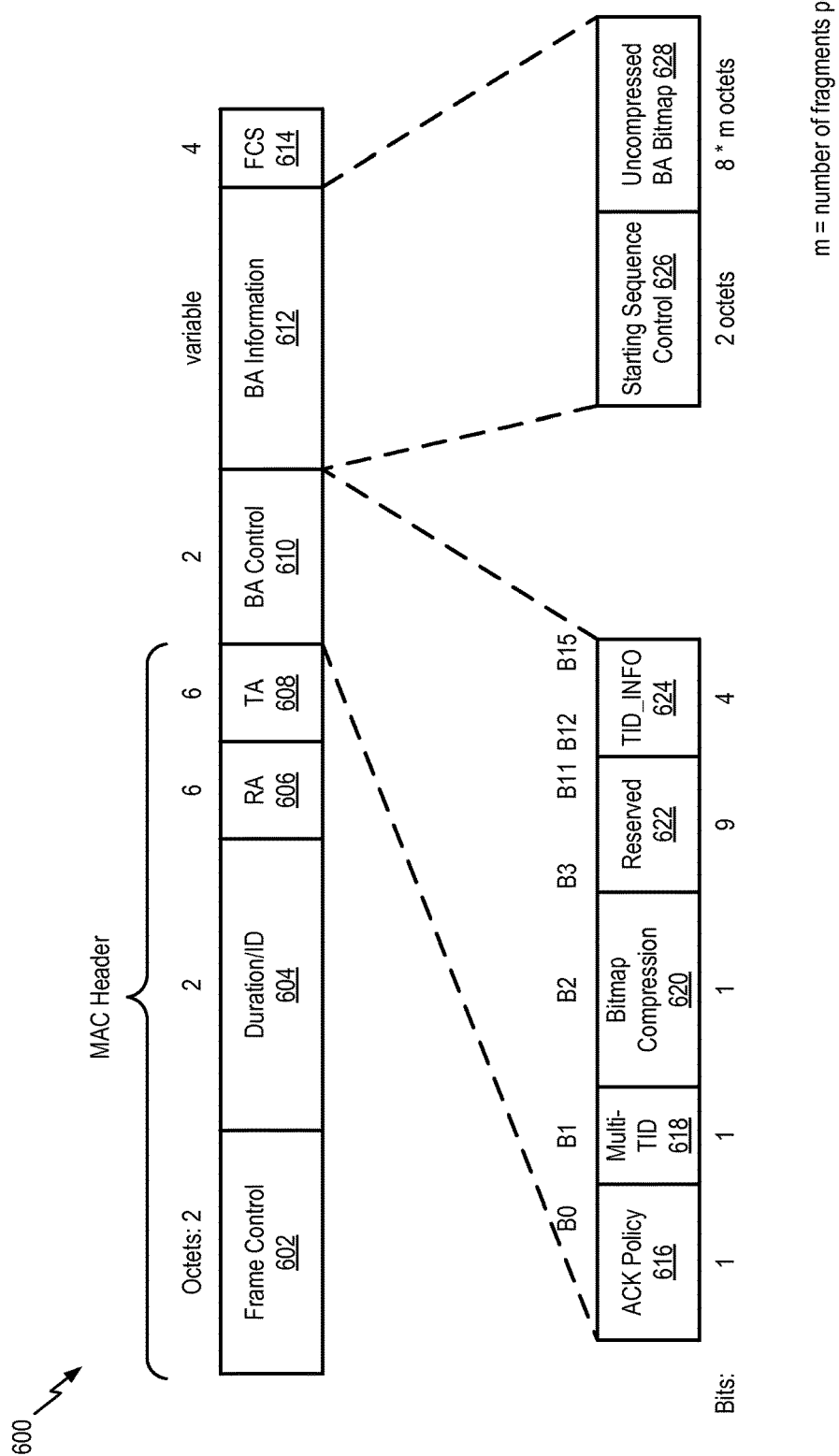
FIG. 6 is a diagram of a first implementation of an uncompressed block acknowledgement (BA) frame that includes one uncompressed BA bitmap.

FIG. 6 illustrates an example of an uncompressed BA frame 600 that includes an uncompressed BA bitmap. In an illustrative implementation, the uncompressed BA frame 600 corresponds to the uncompressed or semicompressed BA frame 150 of FIG. 1, and is generated by the uncompressed or semicompressed BA generation logic 106 of the access point 102. In another particular implementation, the uncompressed BA frame 600 is generated by the processor 108 of the access point 102 executing instructions stored in the memory 110.

The uncompressed BA frame 600 includes a frame control field 602, a duration/identification field (duration/ID field) 604, a receiver address (RA) field 606, a transmitter address (TA) field 608, a BA control field 610, a BA information field 612, and a frame check sequence (FCS) field 614. The frame control field 602, the duration/ID field 604, the RA field 606, and the TA field 608 may form a MAC header of the uncompressed BA frame 600, and may store information specified by an IEEE 802.11 standard. The BA control field 610 may include an acknowledgement (ACK) policy bit 616, such as a BA ACK policy bit, a multi-traffic identifier (multi-TID) bit 618, a bitmap compression bit 620, a set of reserved bits 622, and a set of TID information (TID_INFO) bits 624. The ACK policy bit 616 may indicate whether a response to the uncompressed BA frame 600 should be transmitted, the multi-TID bit 618 may indicate whether the uncompressed BA frame 600 corresponds to multiple TIDs, the bitmap compression bit 620 may indicate whether a BA bitmap included in the BA information field 612 is compressed or uncompressed, and the TID_INFO bits 624 may indicate traffic identifier information.

In a particular implementation, a value of the bitmap compression bit 620 is set to zero to indicate that an uncompressed bitmap is included in the BA information field 612. In an alternate implementation, the value of the bitmap compression bit 620 is set to one to indicate that an uncompressed bitmap is included in the BA information field 612. Additionally, one or more of the set of reserved bits 622 may be used to indicate a number of fragments that each MSDU acknowledged by the uncompressed BA frame 600 is divided into. For example, the devices 114 and 126 of the system 100 of FIG. 1 may fragment (or divide) MSDUs into m data fragments, and m may be represented by one or more bits of the set of reserved bits 622. In a particular implementation, m is a number between two and sixteen (such as MSDUs may be fragmented into up to sixteen fragments). In other implementations, m may be another number.

The BA information field 612 may be a variable-length field and may include a set of starting sequence control bits 626 and an uncompressed BA bitmap 628. The set of starting sequence control bits 626 may identify, and indicate an order of, a set of MSDUs received from a particular device of a wireless communication system, such as the system 100). Additionally or alternatively, the m data fragments may be represented (or signaled) by one or more bits of the set of starting sequence control bits 626. The uncompressed BA bitmap 628 may provide acknowledgment of receipt of data fragments of the MSDUs identified by the set of starting sequence control bits 626. The uncompressed BA bitmap 628 includes a plurality of bits indicating whether each data fragment of the set of MSDUs has been received by an access point, such as the access point 102 of FIG. 1.

To illustrate, when m is two and two MSDUs are acknowledged by the uncompressed BA bitmap 628, a first bit of the uncompressed BA bitmap 628 bitmap may indicate whether a first fragment of a first MSDU has been received, a second bit of the uncompressed BA bitmap 628 may indicate whether a second fragment of the first MSDU has been received, a third bit of the uncompressed BA bitmap 628 may indicate whether a first fragment of a second MSDU has been received, and a fourth bit of the uncompressed BA bitmap 628 may indicate whether a second fragment of the second MSDU has been received. In this example, the set of starting sequence control bits 626 may identify the first MSDU and the second MSDU, in order. In other examples, other numbers of MSDUs may be identified by the set of starting sequence control bits 626, and sets of bits of the uncompressed BA bitmap 628 may indicate whether each fragment of each MSDU has been received. In a particular implementation, the uncompressed BA bitmap 628 is configured to acknowledge receipt of fragments of sixty-four MSDUs. In this implementation, a size of the uncompressed BA bitmap 628 is 8*m octets (such as bytes). In other implementations, receipt of fragments of more or less MSDUs may be acknowledged, and the uncompressed BA bitmap 628 may have a different size.

The uncompressed BA frame 600 illustrated in FIG. 6 is an example of an uncompressed BA frame that may be used in the system 100 and is not to be considered limiting. In other implementations, one or more fields or bits may be included in the uncompressed BA frame 600 that are not illustrated in FIG. 6, and one or more of the illustrated fields or bits may be omitted. In the implementation illustrated in FIG. 6, the uncompressed BA frame 600 includes the single uncompressed BA bitmap 628. Thus, the uncompressed BA frame 600 may be transmitted from the access point 102 to a single device of the system 100. To acknowledge receipt of data from other devices of the system 100, the access point 102 may generate other uncompressed BA frames that include other uncompressed BA bitmaps, and may transmit the other uncompressed BA frames to the other devices.

Figure 7:
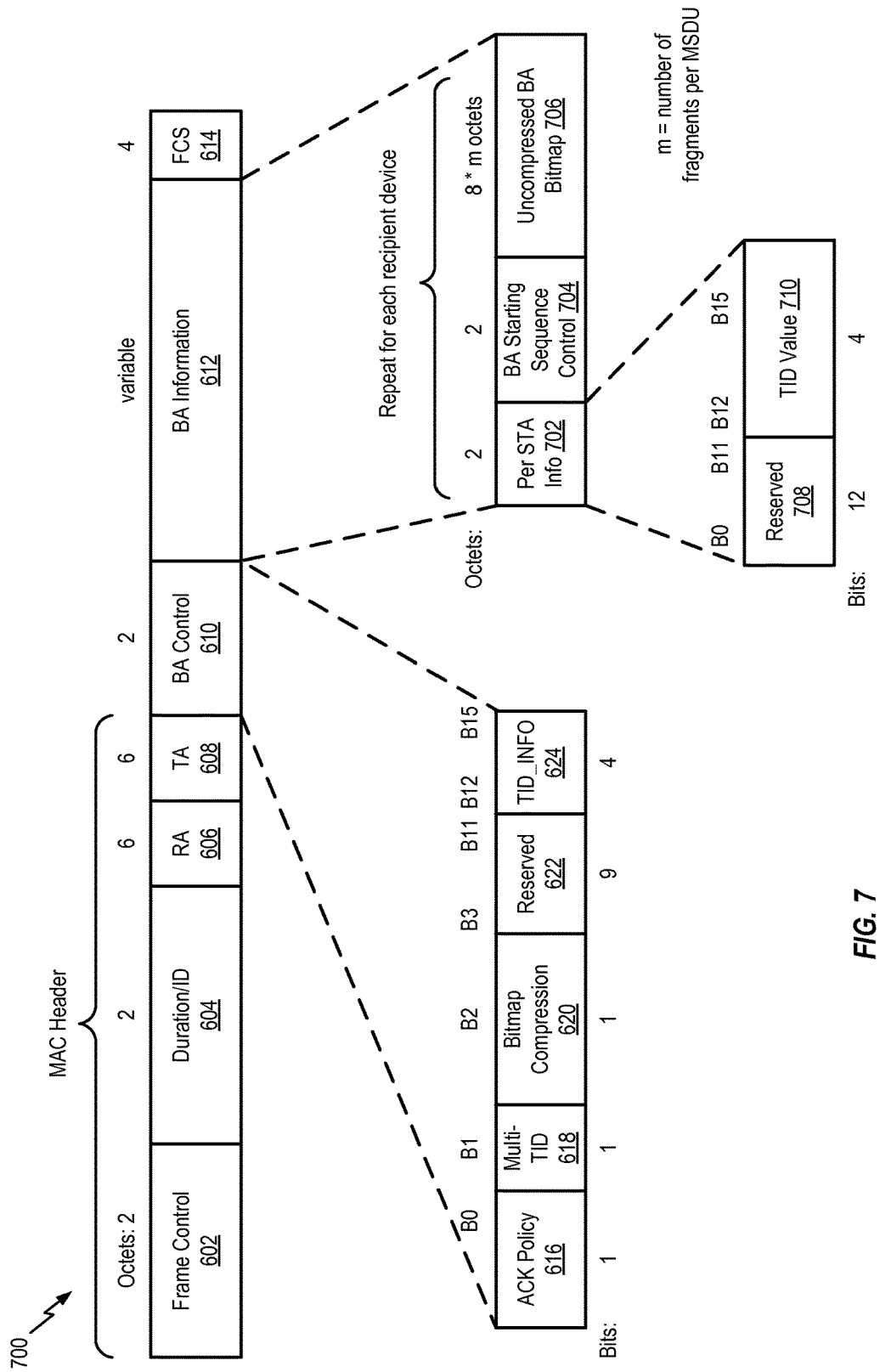
FIG. 7 is a diagram of a second implementation of an uncompressed BA frame that includes multiple uncompressed BA bitmaps.

FIG. 7 illustrates an example of an uncompressed BA frame 700 that includes multiple uncompressed BA bitmaps. The uncompressed BA frame 700 may be transmitted by an access point of a MU wireless communication system to multiple devices of the MU wireless communication system. For example, the uncompressed BA frame 700 may be transmitted as an OFDMA communication, a MIMO communication, or some other multi-user communication. In an illustrative implementation, the uncompressed BA frame 700 corresponds to the uncompressed or semicompressed BA frame 150 of FIG. 1 and is generated by the uncompressed or semicompressed BA generation logic 106 of the access point 102. In another particular implementation, the uncompressed BA frame 700 is generated by the processor 108 of the access point 102 executing instructions stored in the memory 110.

The uncompressed BA frame 700 includes the fields 602-614 and the bits 616-624, as described with reference to FIG. 6. However, in the uncompressed BA frame 700, m (such as the number of fragments that each MSDU received from a particular device is divided into) is not represented by one or more bits of the set of reserved bits 622. Additionally, the BA information field 612 of the uncompressed BA frame 700 differs from the BA information field 612 of the uncompressed BA frame 600.

In FIG. 7, the BA information field 612 may be a variable-length field and may include a set of per STA info bits 702, a set of BA starting sequence control bits 704, and an uncompressed BA bitmap 706 for each device of the system 100 for which the access point 102 acknowledges receipt of data transmissions from. For example, the access point 102 may receive data transmissions from n devices, such as stations, and the BA information field 612 may include n sets of the bits 702 and 704 and n uncompressed BA bitmaps 706. The set of per STA info bits 702 may include a set of reserved bits 708 and a set of TID value bits 710. The set of TID value bits 710 may indicate a value of a traffic identifier. One or more of the set of reserved bits 708 may be used to represent m, such as the number of fragments that each MSDU received from a particular device is divided into.

The set of BA starting sequence control bits 704 may identify MSDUs received from a particular device of a wireless communication system (such as the system 100), may indicate an order of the set of MSDUs the uncompressed BA bitmap 706, or both. The uncompressed BA bitmap 706 may provide acknowledgment of receipt of data fragments of the MSDUs identified by the set of BA starting sequence control bits 704. The uncompressed BA bitmap 706 includes a plurality of bits indicating whether each data fragment of the set of MSDUs has been received by an access point, such as the access point 102 of FIG. 1.

In contrast to the BA information field 612 of the uncompressed BA frame 600 (which includes a single set of starting sequence control bits 626 and a single uncompressed BA bitmap 628), the BA information field 612 of the uncompressed BA frame 700 includes a set of per STA info bits 702, a set of BA starting sequence control bits 704, and an uncompressed BA bitmap 706 for each recipient of the uncompressed BA frame 700. To illustrate, when the uncompressed BA frame 700 is transmitted by the access point 102 to the first device 114 and to the second device 126, the uncompressed BA frame 700 includes a first group including the set of per STA info bits 702, the set of BA starting sequence control bits 704, and the uncompressed BA bitmap 706 corresponding to the first device 114. The uncompressed BA frame 700 also includes a second group including the set of per STA info bits 702, the set of BA starting sequence control bits 704, and the uncompressed BA bitmap 706 corresponding to the second device 126.

To identify which uncompressed BA bitmap 706 corresponds to each recipient device, one or more bits of the set of reserved bits 708 may be used to indicate a station association identifier (STA AID) of a corresponding device. For example, during association with the access point 102, each device (such as the devices 114 and 126) may be assigned a STA AID by the access point 102. The access point 102 may include the STA AID in one or more bits of the set of reserved bits 708 to indicate that the following uncompressed BA bitmap 706 corresponds to a device having the STA AID. Additionally, one or more bits of the set of reserved bits 708 may be used to indicate a value of m related to the corresponding device. For example, each device (of the devices 114 and 126) may divide MSDUs into different numbers of fragments (corresponding to different values of m), and a value of m corresponding to each device (and each uncompressed BA bitmap 706) may be indicated by one or more bits of the set of reserved bits 708.

A size of the BA information field 612 may depend on m (such as the number of fragments that each MSDU received from a particular device is divided into) and a number of recipient devices n. In a particular implementation, a size of each uncompressed BA bitmap 706 is 8*m octets (such as bytes). A size of the set of per STA info bits 702 may be two octets (such as bytes) and a size of the set of BA starting sequence control bits 704 may be two octets (such as bytes). Thus, in the particular implementation, a size of the BA information field 612 is (4+8*m)*n octets (such as bytes). In other implementations, the uncompressed BA bitmap 706 may indicate receipt of data fragments of more or less MSDUs, and the uncompressed BA bitmap 706 (and the BA information field 612) may have a different size. In a particular aspect, all of the stations may have the same value for m, and m may be represented by one or more bits of the set of reserved bits 622. In a particular aspect, a single TID may be used and m may be represented by one or more bits the TID value bits 710.

The uncompressed BA frame 700 illustrated in FIG. 7 is an example of an uncompressed BA frame that may be used in the system 100 and is not to be considered limiting. In other implementations, one or more fields or bits may be included in the uncompressed BA frame 700 that are not illustrated in FIG. 7, and one or more of the illustrated fields or bits may be omitted. In the implementation illustrated in FIG. 7, the uncompressed BA frame 700 includes multiple uncompressed BA bitmaps 706 corresponding to different recipient devices. Thus, the uncompressed BA frame 700 may be transmitted from the access point 102 to multiple devices (such as the devices 114 and 126) of the system 100 as a MU communication. Transmitting a single uncompressed BA frame 700 to multiple devices may reduce overhead in a wireless communication network.

Figure 8:
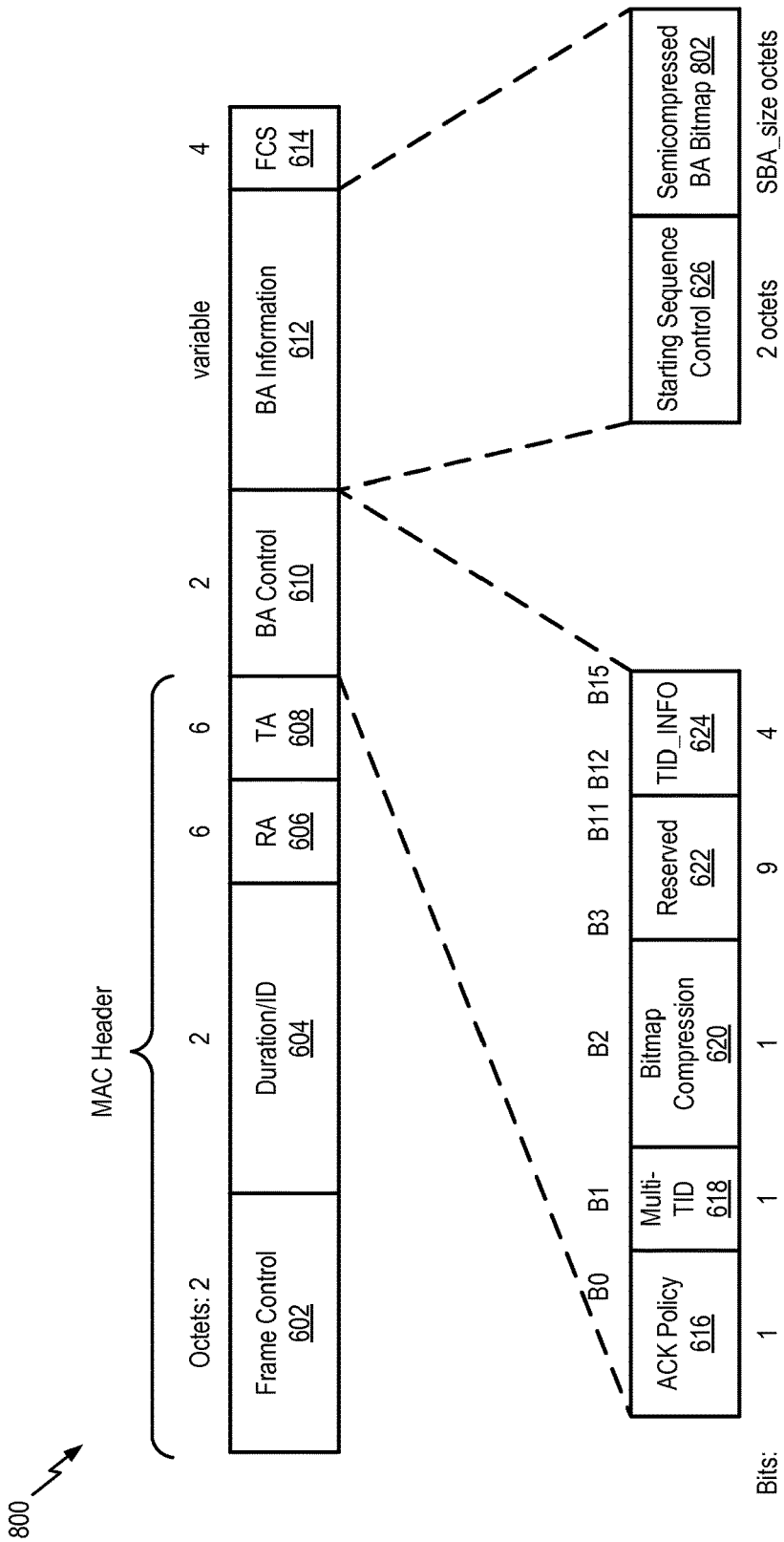
FIG. 8 is a diagram of a first implementation of a semicompressed BA frame that includes one semicompressed BA bitmap.

FIG. 8 illustrates an example of a semicompressed BA frame 800 that includes a single semicompressed BA bitmap. The semicompressed BA frame 800 may be transmitted by an access point or a device, such as a station, of a wireless network. For example, the semicompressed BA frame 800 may be transmitted by an access point of a MU wireless communication system to one or more devices, such as stations, of the MU wireless communication system. In a particular implementation, the semicompressed BA frame 800 may be transmitted as part of an OFDMA communication, a MIMO communication, or some other multi-user communication. In an illustrative implementation, the semicompressed BA frame 800 corresponds to the uncompressed or semicompressed BA frame 150 of FIG. 1 and is generated by the uncompressed or semicompressed BA generation logic 106 of the access point 102. In another particular implementation, the semicompressed BA frame 800 is generated by the processor 108 of the access point 102 executing instructions stored in the memory 110.

The semicompressed BA frame 800 includes the fields 602-614 and the bits 616-624, as described with reference to FIG. 6. However, in the semicompressed BA frame 800, the BA information field 612 of the semicompressed BA frame 800 includes the set of starting sequence control bits 626 and a semicompressed BA bitmap 802. The semicompressed BA bitmap 802 may indicate whether one or more data fragments corresponding to each MSDU of a sequence of MSDUs (indicated by the set of starting sequence control bits 626) have been received by an access point. In contrast to the uncompressed BA bitmap 628 of FIG. 6, the semicompressed BA bitmap 802 may include only enough bits to indicate whether a subset of data fragments (such as one or two data fragments) corresponding to each MSDU in the sequence have been received. Accordingly, a data size of the semicompressed BA bitmap 802, for example 4 bits, may be less than a data size of the uncompressed BA bitmap 628 of FIG. 6, for example 16 bits. In some implementations, the data size of the semicompressed BA bitmap 802 may not be less than the data size of the uncompressed BA bitmap 628 when a device, such as the first device 114 of FIG. 1, transmits many data fragments in a single PPDU of a data packet. Thus, the semicompressed BA bitmap 802 may be used in wireless systems that include devices configured to transmit one or two data fragments in a PPDU, and the uncompressed BA bitmap 628 may be used in wireless systems that include devices configured to transmit three or more data fragments in a PPDU.

An indication that the semicompressed BA frame 800 includes a semicompressed BA bitmap may be represented by one or more bits of the set of reserved bits 622. As a non-limiting example, a particular bit of the set of reserved bits 622 may have a first value (such as a logical zero value) when no semicompressed BA bitmap is included (such as when the BA frame includes a compressed BA bitmap or an uncompressed BA bitmap), and the particular bit may have a second value (such as a logical one value) when the semicompressed BA bitmap 802 is included. Additionally, one or more bits of the set of reserved bits 622 may be used to indicate a threshold (such as a maximum) number k of fragments into which each MSDU (such as each data unit) may be fragmented by a transmitting station, such as the first device 114 of FIG. 1. In a particular implementation, k is a number between two and sixteen. In other implementations, k may be another number.

In a first implementation, the bitmap compression bit 620 has a first value, such as a logical zero value. In this implementation, the semicompressed BA bitmap 802 includes a plurality of bits indicating one or more data fragment identifiers. Each of the one or more data fragment identifiers corresponds to a data fragment of one of a plurality of data units corresponding to a particular BA sequence. Each data fragment identifier may include log 2(k) bits and may indicate that an identified data fragment of the corresponding MSDU has been received by the access point. The number of data fragment identifiers in the semicompressed BA bitmap 802 that correspond to the same MSDU may be the same as the number of data fragments included in a PPDU by the transmitting device, such as the first device 114 of FIG. 1.

To illustrate, consider a case when the device is configured to transmit a single data fragment in a PPDU to the access point. Additionally, the maximum amount of data fragments for a single data unit (such as PPDU) is four. In this example, the device sends, to the access point, a single data fragment of a first MSDU as well as a non-fragmented (or "full") second MSDU. To acknowledge receipt of the data from the device, the semicompressed BA bitmap 802 includes a first data fragment identifier that identifies the data fragment corresponding to the first MSDU. Additionally, because the second MSDU is a non-fragmented MSDU, the bits allotted (such as allocated) in the semicompressed BA bitmap 802 to identify a data fragment of the second MSDU are used to identify the non-fragmented MSDU. In this example, each data fragment identifier includes at least two bits (such as log 2(4)=2) which denote the data fragment identifier (such as 00, 01, 10, or 11), and indicates which of the four data fragments of the corresponding MSDU have been received by the access point in a received data packet. To illustrate, when the access point receives a data packet including a third fragment of the first MSDU, a value of the first data fragment identifier in the semicompressed BA bitmap 802 is 10. As another example, when the device is configured to transmit two data fragments in a PPDU (and the number of data fragments per MSDU and the number of MSDUs are the same as above), the semicompressed BA bitmap 802 includes two data fragment identifiers of data fragments corresponding to the threshold (such as the maximum) number of MSDUs. Thus, a data size (SBA_size) of the semicompressed BA bitmap 802 may be y*x*log 2(k)/8 octets (such as bytes), where y is the number of data fragments transmitted in a PPDU and x is the threshold (such as the maximum) number of MSDUs in the sequence. In one particular aspect, x may have a value of 64.

In a second implementation, the bitmap compression bit 620 has a second value (such as a logical one value). In this implementation, the semicompressed BA bitmap 802 includes a compressed BA bitmap and a set of fragment identification subfields. The compressed BA bitmap may represent receipt by the access point of each MSDU of a sequence of MSDUs that are not fragmented. Each bit of the compressed bitmap may have a value that indicates whether a corresponding non-fragmented MSDU has been received by the access point. For example, a compressed BA bitmap having a value of 0110 may indicate that a second MSDU and a third MSDU have been received by the access point and that a first MSDU and a fourth MSDU have not been received. The set of fragment identification subfields may include a sequence identifier subfield and a data fragment identifier that each correspond to a data fragment received from the device. The sequence identifier subfield may indicate a sequence control value that identifies a particular MSDU in the sequence of MSDUs transmitted by the device, and the data fragment identifier subfield may identify which of the k data fragments (corresponding to the MSDU identified by the sequence identifier subfield) has been received by the access point.

To illustrate, when the access point receives a data packet having a PPDU that includes three MSDUs and a first data fragment of a fourth MSDU, the semicompressed BA bitmap 802 includes a compressed BA bitmap indicating receipt of the first, second, and third MSDU, a sequence identifier subfield indicating the fourth MSDU, and a data fragment identifier subfield indicating the first data fragment. As another example, when the access point receives a data packet having a PPDU that includes a second data fragment of the first MSDU, the second MSDU, the third MSDU, and a first data fragment of the fourth MSDU, the semicompressed BA bitmap 802 includes a compressed BA bitmap indicating receipt of the second and third MSDUs, a first sequence identifier subfield indicating the first MSDU, a first data fragment identifier subfield indicating the second data fragment (of the first MSDU), a second sequence identifier subfield indicating the fourth MSDU, and a second data fragment identifier subfield indicating the first data fragment (of the fourth MSDU). A data size (SBA_size) of the semicompressed BA bitmap 802 may be x/8+approximately 2-6 octets (such as bytes), where x is the number of MSDUs in the sequence (and thus the compressed bitmap is approximately x/8 octets and the additional subfields are approximately 2-6 octets depending on implementation). In one implementation, the fragment identifiers are indicated when the corresponding data fragments are successfully received by the access point In this implementation, fragment identifiers corresponding to data fragments that have not been successfully received are not included in the semicompressed BA bitmap 802.

In a particular implementation, the number of data fragments k, the number of MSDUs in a sequence x, and the number of data fragments in a PPDU y are fixed. For example, values of k, x, and y may be stored in memories of the access point and the device during manufacturing. In a particular implementation, k has a fixed value of 16. In other implementations, k may have other values. In another particular implementation, the values of k, x, and y are variable. In this implementation, the values of k, x, and y may be determined by each device and communicated to the access point. For example, the values of k, x, and y corresponding to the first device 114 may be included in the first ADDBA request 162 transmitted from the first device 114 to the access point 102. Additionally, the values of k, x, and y corresponding to the second device 126 may be included in the second ADDBA request 164 transmitted from the second device 126 to the access point 102. Because each device may transmit an ADDBA request, each device may select different values for k, x, and y. In another particular implementation, the access point 102 may select the values of k, x, and y and may provide the values of m, x, and y to the devices 114 and 126 (such as the stations).

The semicompressed BA frame 800 illustrated in FIG. 8 is an example of a semicompressed BA frame that may be used by devices in the system 100 and is not to be considered limiting. In other implementations, one or more fields or bits may be included in the semicompressed BA frame 800 that are not illustrated in FIG. 8, and one or more of the illustrated fields or bits may be omitted. In the implementation illustrated in FIG. 8, the semicompressed BA frame 800 includes the single semicompressed BA bitmap 802. Thus, the semicompressed BA frame 800 may be transmitted from the access point 102 to a single device of the system 100. To acknowledge receipt of data from other devices of the system 100, the access point 102 may generate other semicompressed BA frames that include other semicompressed BA bitmaps, and the access point 102 may transmit the other semicompressed BA frames to the other devices. Additionally or alternatively, the semicompressed BA may be transmitted by a station (such as the first device 114 or the second device 126) to the access point 102 in response to receiving data (such as downlink (DL) data) from the access point 102.

Figure 9:
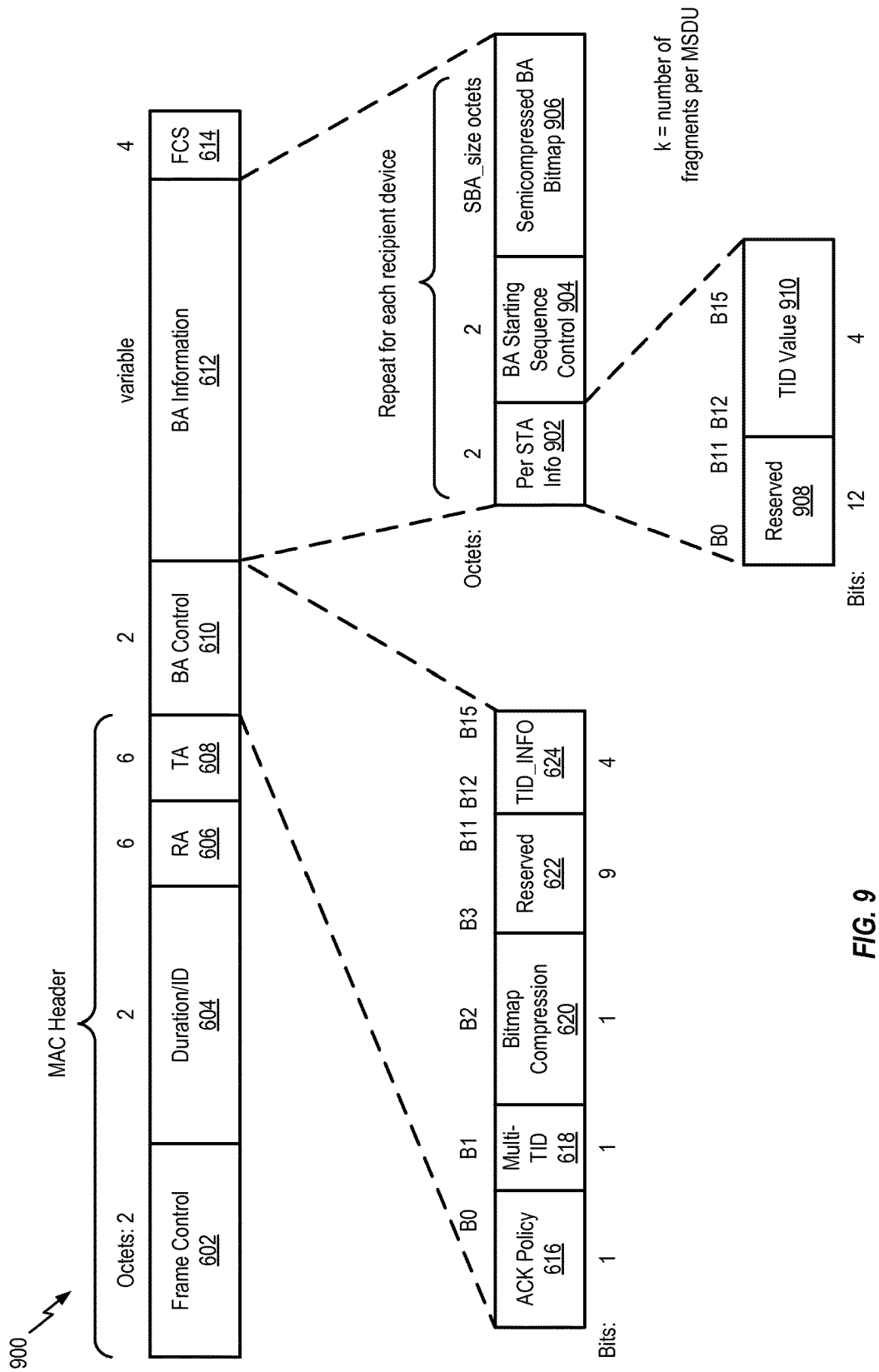
FIG. 9 is a diagram of a second implementation of a semicompressed BA frame that includes multiple semicompressed BA bitmaps.

FIG. 9 illustrates an example of a semicompressed BA frame 900 that includes multiple semicompressed BA bitmaps. The semicompressed BA frame 900 may be transmitted by an access point of a MU wireless communication system to multiple devices of the MU wireless communication system. For example, the semicompressed BA frame 900 may be transmitted as part of an OFDMA communication, a MIMO communication, or some other multi-user communication. In an illustrative implementation, the semicompressed BA frame 900 corresponds to the uncompressed or semicompressed BA frame 150 of FIG. 1 and is generated by the uncompressed or semicompressed BA generation logic 106 of the access point 102. In another particular implementation, the semicompressed BA frame 900 is generated by the processor 108 of the access point 102 executing instructions stored in the memory 110.

The semicompressed BA frame 900 includes the fields 602-614 and the bits 616-624, as described with reference to FIG. 8. However, in the semicompressed BA frame 900, the BA information field 612 of the semicompressed BA frame 900 includes, for each of n recipient devices of the semicompressed BA frame 900, a corresponding set of per STA information bits 902, a corresponding set of BA starting sequence control bits 904, and a corresponding semicompressed BA bitmap 906. For example, the BA information field 612 of the semicompressed BA frame 900 may be the same as the BA information field 612 of the uncompressed BA frame 700, except that the uncompressed BA bitmap 706 is replaced by the semicompressed BA bitmap 906.

In FIG. 9, the set of per STA information bits 902 includes a set of reserved bits 908 and a set of TID value bits 910. The set of TID value bits 910 may indicate a value of a traffic identifier. One or more bits of the set of reserved bits 908 may be used to represent k (such as the number of data fragments) for each of the n recipient devices. The set of BA starting sequence control bits 904 may identify a sequence of MSDUs corresponding to each of the n recipient devices. The semicompressed BA bitmap 906 may provide acknowledgment of receipt of one or more data fragments corresponding to the sequence of MSDUs identified by the set of BA starting sequence control bits 904. The semicompressed BA bitmap 906 includes a plurality of bits indicating whether each data fragment of the set of MSDUs has been received by an access point (such as the access point 102 of FIG. 1). Each semicompressed BA bitmap 906 may be formatted according to either implementation of the semicompressed BA bitmap 802 described with reference to FIG. 8.

To identify which semicompressed BA bitmap 906 corresponds to each recipient device, one or more bits of the set of reserved bits 908 may be used to indicate a station association ID (STA AID) of a corresponding device. For example, during association with the access point 102, each device (such as the devices 114 and 126) may be assigned a STA AID by the access point 102. The access point 102 may include the STA AID in one or more bits of the set of reserved bits 908 to indicate that the following semicompressed BA bitmap 906 corresponds to a device having the STA AID. Additionally, one or more bits of the set of reserved bits 908 may be used to indicate a value of k related to the corresponding device. For example, each device (of the devices 114 and 126) may be configured to enable MSDUs to be divided into different thresholds (such as maximum) numbers of fragments (corresponding to different values of k), and a value of k corresponding to each device may be indicated by one or more bits of the set of reserved bits 908. A data size of the semicompressed BA bitmap 906 may be related to the particular implementation of the semicompressed BA bitmap 906.

The semicompressed BA frame 900 illustrated in FIG. 9 is an example of a semicompressed BA frame that may be used by devices in the system 100 and is not to be considered limiting. In other implementations, one or more fields or bits may be included in the semicompressed BA frame 900 that are not illustrated in FIG. 9, and one or more of the illustrated fields or bits may be omitted. In the implementation illustrated in FIG. 9, the semicompressed BA frame 900 includes multiple semicompressed BA bitmaps 906 corresponding to different recipient devices. Thus, the semicompressed BA frame 900 may be transmitted from the access point 102 to multiple devices (such as the devices 114 and 126) of the system 100 as a MU communication. Transmitting a single semicompressed BA frame 900 to multiple devices may reduce overhead in a wireless communication network.

Figure 10:
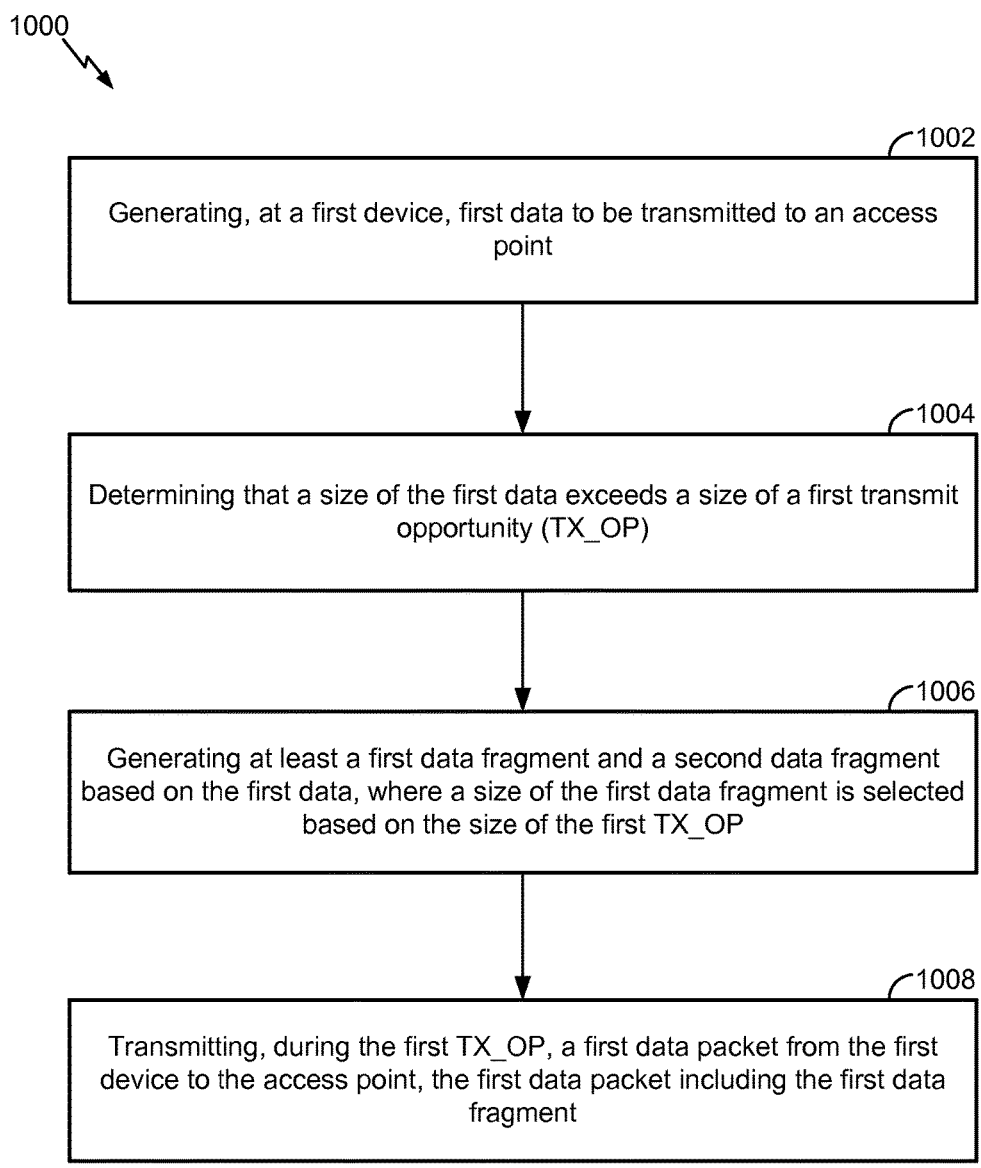
FIG. 10 is a flow diagram of an illustrative method of operation at a device (of a wireless communication system)

Referring to FIG. 10, an illustrative implementation of a method for wireless communication is shown and designated as the method 1000. For example, the method 1000 may be associated with operation at a device of a MU wireless communication system. In an illustrative implementation, the method 1000 may be performed by the first device 114 or the second device 126 of FIG. 1. In some implementations, steps of the method 1000 may be performed in other orders, or one or more steps of the method 1000 may be optional and may not be performed in all implementations).

The method 1000 includes generating, at a first device, first data to be transmitted to an access point, at 1002. For example, with reference to FIG. 1, the data generation logic 116 of the first device 114 generates first data to be transmitted to the access point 102.

The method 1000 includes determining that a size of the first data exceeds a size of a first TX_OP, at 1004. For example, with reference to FIG. 1, the first device 114 (such as the data generation logic 116, the processor 120, or both) determines that a size of the first data exceeds a first TX_OP used by the first device 114 and the second device 126.

The method 1000 includes generating at least a first data fragment and a second data fragment based on the first data, at 1006. A size of the first data fragment is selected based on the size of the first TX_OP. For example, with reference to FIG. 1, the data fragmentation logic 118 of the first device 114 generates at least the first fragment 142 and the second fragment 144. A size of the first data fragment is selected based on the size of the first TX_OP. For example, the first data is fragmented (or divided) so that a size of the first fragment 142 does not exceed a threshold amount of data capable of being transmitted during the first TX_OP.

The method 1000 further includes transmitting, during the first TX_OP, a first data packet from the first device to the access point, at 1008. The first data packet includes the first data fragment. For example, with reference to FIG. 1, the first data packet including the first fragment 142 is transmitted from the first device 114 to the access point 102 during the first TX_OP. In a particular implementation, generating the first data packet includes determining, based on a MCS corresponding to the first device, a threshold amount of data that the first device is capable of transmitting during the first TX_OP and dividing the first data into the first data fragment having a size that does not exceed the threshold amount. For example, the data fragmentation logic 118 may determine the threshold amount of data based on the size (such as a duration) of the first TX_OP and the MCS used by the first device 114. The data fragmentation logic 118 may divide the first data such that the first fragment 142 has a size that does not exceed the threshold amount of data. In at least some implementations, a size of overhead (such as MAC headers, PPDU preambles, etc.) of the first data packet is also included in the determination of the size of the first fragment 142. In other implementations, the size of the overhead may be negligible compared to the size of the first fragment 142. In another particular implementation, the first data packet includes fragmentation information including a sequence identifier (ID) number, a fragment number, and a more fragments indicator.

In a particular implementation, the first device, the one or more other devices, and the access point each perform MU communications. For example, the system 100 may be a MU wireless communication system. In a particular implementation, the first device, the one or other devices, and the access point each perform OFDMA communications or MIMO communications. Additionally or alternatively, the first data packet may be transmitted via a wireless network that operates in accordance with one or more IEEE 802.11 standards.

In another particular implementation, the first data includes a first media access control (MAC) layer service data unit, the first data fragment includes a first fragment of the first MAC layer service data unit, and the second data fragment includes a second fragment of the first MAC layer service data unit. For example, with reference to FIG. 2, the first data includes the MSDU 202, the first data fragment includes the first fragment of the MSDU 202, and the second data fragment includes the second fragment of the MSDU 202. Additionally, the first data packet includes a first physical layer protocol data unit, a payload of the first physical layer protocol data unit includes a first MAC layer protocol data unit, and the first MAC layer protocol data unit includes the first data fragment. For example, with reference to FIG. 2, the first data packet includes the first PPDU 208, a payload of the first PPDU 208 includes the first MPDU 204, and the first MPDU 204 includes the first fragment of the MSDU 202. Additionally, the method 1000 includes transmitting, during a second TX_OP, a second data packet to the access point, where the second data packet includes a second physical layer protocol data unit, where a payload of the second physical layer protocol data unit includes a second MAC layer protocol data unit, and where the second MAC layer protocol data unit includes the second data fragment. For example, with reference to FIG. 2, the second data packet transmitted during the second TX_OP includes the second PPDU 210, the second PPDU 210 includes the second MPDU 206, and the second MPDU 206 includes the second data fragment. Additionally or alternatively, the second PPDU includes an aggregated MAC layer protocol data unit (also referred to as an aggregated MAC protocol data unit (A-MPDU)) that includes the second MAC layer protocol data unit, a third MAC layer protocol data unit, and a fourth MAC layer protocol data unit, the third MAC layer protocol data unit includes a second MAC layer service data unit, the fourth MPDU includes a first fragment of a third MAC layer service data unit, and a combined size of the second data fragment, the second MAC layer service data unit, and the first fragment of the third MAC layer service data unit does not exceed a size of the second TX_OP. For example, with reference to FIG. 4, the second PPDU 422 includes an aggregated MPDU (A_MPDU_2) that includes the second MPDU 414, the fourth MPDU 416, and the fifth MPDU 418. The fourth MPDU 416 may include the third MSDU 406, the fifth MPDU 418 includes a fragment of the fourth MSDU 408, and a combined size of the data fragment, the fourth MPDU 416, and the fragment of the fifth MPDU 418 does not exceed the size of the second TX_OP.

In another particular implementation, the method 1000 includes transmitting, during a second TX_OP of the first device and the one or more other devices, a second data packet from the first device to the access point. The second data packet may include the second data fragment. For example, with reference to FIG. 1, the first device 114 transmits the second data packet including the second fragment 144 of the first data to the access point 102 during the second TX_OP. In a particular implementation, a size of the first data fragment is the same as a size of the second data fragment. For example, the data fragmentation logic 118 may divide the first data in half when generating the first fragment 142 and the second fragment 144. Alternatively, a size of the first data fragment is different than a size of the second data fragment. The second data packet may include the second data fragment and padding. For example, with reference to FIG. 2, the first PPDU 208 includes the first MPDU 204 that includes the first fragment of the MSDU 202, and the second PPDU 210 includes the second MPDU 206 that includes the second fragment of the MSDU 202 and padding (such as one or more null bits). The first fragment of the MSDU 202 may be larger than the second fragment of the MSDU 202.

In another particular implementation, the method 1000 includes receiving a trigger frame from the access point at the first device. The trigger frame may indicate timing information corresponding to the first TX_OP. For example, with reference to FIG. 1, the first device 114 receives the trigger frame 140 from the access point 102 prior to the first TX_OP. The trigger frame 140 indicates timing information corresponding to the first TX_OP.

In another particular implementation, the first data includes a first MAC layer service data unit, the first data fragment includes a first fragment of the first MAC layer service data unit, and the second data fragment includes a second fragment of the first MAC layer service data unit. For example, with reference to FIG. 3, the first data includes the second MSDU 304 that is fragmented into a first fragment and a second fragment. Additionally, the first data may include a second MAC layer service data unit, the first data packet may include a first physical layer protocol data unit, a payload of the first physical layer protocol data unit may include an A-MPDU including a first MPDU and a second MPDU, the first MPDU may include the first data fragment, and the second MPDU may include the second MAC layer service data unit. For example, with reference to FIG. 3, the first PPDU 316 includes the A-MPDU A_MPDU_1 that includes first MPDU 308 and the second MPDU 310, the first MPDU 308 includes the first MSDU 302, and the second MPDU 310 includes the first fragment of the second MSDU 304. The first PPDU 316 is transmitted during the first TX_OP.

Alternatively, the method 1000 includes transmitting, during a second TX_OP of the first device and the one or more other devices, a second data packet from the first device to the access point. The second data packet may include a second physical layer protocol data unit, a payload of the second physical layer protocol data unit may include a second MPDU, and the second MPDU may include the second data fragment. For example, with reference to FIG. 4, the second PPDU 422 includes the second A-MPDU A_MPDU 2 that includes the third MPDU 414, and the third MPDU 414 includes the second fragment of the second MSDU 404. The second PPDU 422 is transmitted during the second TX_OP. Additionally, the second physical layer protocol data unit may include an A-MPDU that includes the second MPDU, a third MPDU, and a fourth MPDU, the third MPDU may include a second MAC layer service data unit, and the fourth MPDU may include a first fragment of a third MAC layer service data unit. In some implementations, the method 1000 may include combining the second data fragment, a second MAC layer service data unit of the third MAC layer protocol data unit, and a first fragment of a third MAC layer service data unit of the fourth MAC layer protocol data unit to have a size that is less than or equal to a size of the second TX_OP. For example, with reference to FIG. 4, the second PPDU 422 includes the second A-MPDU A_MPDU 2 that includes the third MPDU 414, the fourth MPDU 416, and the fifth MPDU 418. The fourth MPDU 416 includes the third MSDU 406, and the fifth MPDU 418 includes the first fragment of the fourth MSDU 408. A size of the second A-MPDU (such as a combination of the third MPDU 414, the fourth MPDU 416, and the fifth MPDU 418) does not exceed a size of the second TX_OP.

In another particular implementation, the method 1000 includes receiving a block acknowledgement frame from the access point at the first device. The block acknowledgment frame may include a first uncompressed block acknowledgment bitmap corresponding to the first device. For example, with reference to FIG. 1, the first device 114 may receive the uncompressed or semicompressed BA frame 150 (including the first uncompressed BA bitmap) from the access point 102. The first uncompressed BA bitmap may include a plurality of bits indicating whether data fragments of a plurality of data units corresponding to the first device 114 have been received by the access point 102. In a particular implementation, the block acknowledgment frame includes a single uncompressed block acknowledgment frame. For example, the BA frame may correspond to the uncompressed BA frame 600 of FIG. 6. Alternatively, the block acknowledgment frame may include a second uncompressed block acknowledgment bitmap corresponding to a second device, and the second uncompressed block acknowledgment bitmap may include a second plurality of bits indicating whether data fragments of a second plurality of data units transmitted by the second device have been received by the access point. For example, with reference to FIG. 7, the uncompressed BA frame 700 may include multiple uncompressed BA bitmaps 706 corresponding to different devices (indicated by STA AIDs represented by one or more bits of the set of reserved bits 708). Additionally or alternatively, the method 1000 includes determining whether one or more bits of the first uncompressed block acknowledgment bitmap that correspond to the first data fragment have a particular value and transmitting, during a second TX_OP of the first device, a second data packet including the first data fragment from the first device to the access point when the one or more bits have the particular value. For example, with reference to FIG. 1, when the first device 114 determines, based on one or more bits of the first uncompressed BA bitmap in the uncompressed or semicompressed BA frame 150, that the first fragment 142 has not been received, successfully decoded, or both, by the access point 102, the first device 114 retransmits the first fragment 142 during the second TX_OP.

In some implementations, the method 1000 includes receiving, at the first device operating as the access point during a second TX_OP, a third data packet from the second device and a fourth data packet from a third device, the third data packet including a third data fragment, and the fourth data packet including a fourth data fragment. For example, the first device 114 may also operate as the access point 102, as described with reference to FIG. 1. The first device 114, operating as the access point 102 may receive a second packet including the first fragment 146 of second data and may receive a third packet including a third fragment of third data from a third device, as described with reference to FIG. 1. The method 1000 also includes generating, at the device operating as the access point, a block acknowledgement (BA) frame including a first uncompressed BA bitmap and a second uncompressed BA bitmap, where the first uncompressed BA bitmap indicates one or more data fragments received from the second device, and where the second uncompressed BA bitmap indicates one or more data fragments received from the third device. For example, the first device 114, operating as the access point 102 may generate the uncompressed or semicompressed BA frame 150, which may indicate that the first fragment 146 of second data and the second fragment 148 of second data were received from the second device 126. The method 1000 further includes transmitting the BA frame from the first device operating as the access point to the second device and to the third device. For example, the first device 114, operating as the access point 102 may transmit the uncompressed or semicompressed BA frame 150 to the second device 126 and to a third device, as described with reference to FIG. 1.

In other implementations, the method 1000 includes receiving, at the first device operating as the access point during a second TX_OP, at least a third data packet from the second device and a fourth data packet from a third device, the third data packet including a third data fragment and the fourth data packet including a fourth data fragment. For example, the first device 114 may also operate as the access point 102, as described with reference to FIG. 1. The first device 114, operating as the access point 102 may receive a second packet including the first fragment 146 of second data and may receive a third packet including a third fragment of third data from a third device, as described with reference to FIG. 1. The method 1000 also includes generating, at the first device operating as the access point in response to receipt of the third data packet, a BA frame including at least a first semicompressed BA bitmap, where the first semicompressed BA bitmap indicates one or more data fragments received from the second device, and where a data size of the first semicompressed BA bitmap is less than a data size of an uncompressed BA bitmap. For example, the first device 114, operating as the access point 102 may generate the uncompressed or semicompressed BA frame 150, which may indicate that the first fragment 146 of second data and the second fragment 148 of second data were received from the second device 126. The method 1000 further includes transmitting the BA frame from the first device operating as the access point to the second device. For example, the first device 114, operating as the access point 102 may transmit the uncompressed or semicompressed BA frame 150 to the second device 126, as described with reference to FIG. 1.

The method 1000 enables a device of a MU wireless communication system to transmit data fragments in data packets during TX_OPs that would otherwise be unused by the device. Transmitting the data fragments, instead of failing to transmit data, reduces unused TX_OPs by the device and increases efficiency and reduces latency of the MU wireless communication system.

Figure 11:
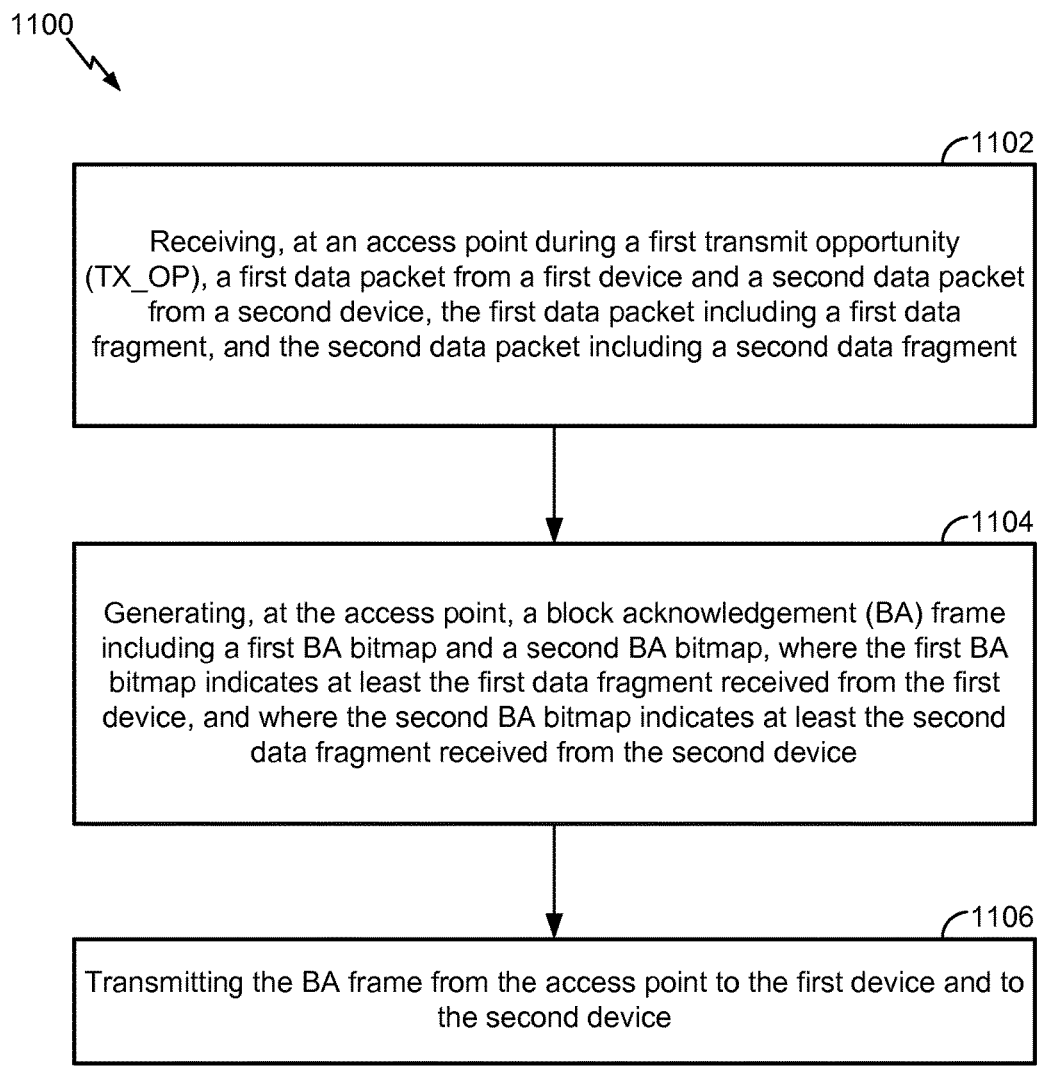
FIG. 11 is a flow diagram of an illustrative method of operation at an access point (of a wireless communication system)

Referring to FIG. 11, an illustrative implementation of a method 1100 of wireless communication is shown. For example, the method 1100 may be associated with operation at an access point of a MU wireless communication system. In an illustrative implementation, the method 1100 may be performed by the access point 102 of FIG. 1. In some implementations, steps of the method 1100 may be performed in other orders, or one or more steps of the method 1100 may be optional and may not be performed in all implementations).

The method 1100 includes receiving, at an access point during a first TX_OP, a first data packet from a first device and a second data packet from a second device, at 1102. The first data packet includes a first data fragment. The second data packet includes a second data fragment. For example, with reference to FIG. 1, the access point 102 receives the first data packet including the first fragment 142 of the first data from the first device 114 during the first TX_OP. The access point 102 also receives the third data packet including the first fragment 146 of the second data from the second device 126 during the first TX_OP.

The method 1100 includes generating, at the access point, a block acknowledgement frame including a first block acknowledgement bitmap and a second block acknowledgement bitmap, at 1104. The first block acknowledgement bitmap indicates at least the first data fragment received from the first device, and the second block acknowledgement bitmap indicates at least the second data fragment received from the second device. In a particular implementation, the first block acknowledgement bitmap includes a first uncompressed block acknowledgement bitmap, and the second block acknowledgement bitmap includes a second uncompressed block acknowledgement bitmap. For example, with reference to FIG. 1, the uncompressed or semicompressed BA generation logic 106 of the access point 102 generates the uncompressed or semicompressed BA frame 150 including the first uncompressed BA bitmap and the second uncompressed BA bitmap. The block acknowledgement frame may be formed in accordance with an IEEE 802.11 standard. The block acknowledgement frame may correspond to the uncompressed BA frame 700 of FIG. 7, including the multiple uncompressed BA bitmaps 706. In other implementations, the first block acknowledgement bitmap includes a first semicompressed block acknowledgement bitmap, and the second block acknowledgement bitmap includes a second semicompressed block acknowledgement bitmap. Generation of semicompressed BA bitmaps is further described with reference to FIG. 12.

The method 1100 further includes transmitting the block acknowledgement frame from the access point to the first device and to the second device, at 1106. For example, with reference to FIG. 1, the access point 102 transmits the uncompressed or semicompressed BA frame 150 to the first device 114 and to the second device 126.

In a particular implementation, the BA frame includes a frame control field, a duration/ID field, a receiver address field, a transmitter address field, a block acknowledgement control field, a block acknowledgement information field, and a frame check sequence field. The BA control field may include an acknowledgement policy bit (e.g., a BA ACK policy bit), a multi-traffic identifier bit, a bitmap compression bit, a set of reserved bits, and a set of multi-traffic identifier information bits. For example, with reference to FIG. 7, the uncompressed BA frame 700 includes the frame control field 602, the duration/ID field 604, the RA field 606, the TA field 608, the BA control field 610, the BA information field 612, and the FCS field 614, and the BA control field 610 includes the ACK policy bit 616, the multi-TID bit 618, the bitmap compression bit 620, the set of reserved bits 622, and the set of TID_INFO bits 624. Additionally, the block acknowledgement information field may include multiple sets of per STA information bits, multiple sets of BA starting sequence control bits, and multiple uncompressed block acknowledgement bitmaps including the first uncompressed block acknowledgement bitmap and the second uncompressed block acknowledgement bitmap. For example, with reference to FIG. 7, the BA information field 612 includes multiple sets of per STA info bits 702, multiple sets of BA starting sequence control bits 704, and multiple uncompressed BA bitmaps 706.

In another particular implementation, the method 1100 includes receiving, during a second TX_OP of the first device and the second device, a third data packet from the first device at the access point. The third data packet may include a third data fragment, and the first data fragment and the third data fragment may be fragments of the same MSDU. For example, with reference to FIG. 1, the access point 102 may receive the second packet including the second fragment 144 of the first data from the first device 114 during the second TX_OP. The first fragment 142 and the second fragment 144 may be fragments of the same MSDU (such as the MSDU 202 of FIG. 2, the second MSDU 304 of FIG. 3, or the second MSDU 404 of FIG. 4).

In another particular implementation, the first data packet includes fragmentation information including a sequence identifier number, a fragment number, and a more fragments indicator. The method 1100 may further include determining whether a particular data fragment corresponding to the sequence identifier number has been received from the first device at the access point and setting a particular bit of the first uncompressed BA bitmap to a first value when the particular data fragment has not been received. For example, with reference to FIG. 1, the access point 102 determines whether the first fragment 142 has been received and sets a particular bit of the first uncompressed BA bitmap (in the uncompressed or semicompressed BA frame 150) that corresponds to the first fragment 142 to a first value when the first fragment 142 has not been received. The method 1100 may further include setting the particular bit to a second value when the particular data fragment has been received. For example, with reference to FIG. 1, the access point 102 sets the particular bit to a second value when the first fragment 142 has been received. Additionally or alternatively, the method 1100 includes receiving, during a second TX_OP of the first device and the second device, a third data packet from the first device at the access point, the third data packet including the particular data fragment. For example, with reference to FIG. 1, after transmitting the uncompressed or semicompressed BA frame 150 indicating that the first fragment 142 has not been received, the access point 102 receives a retransmission of the first fragment 142 during the second TX_OP (instead of or in addition to the second fragment 144).

The method 1100 enables an access point of a MU wireless communication system to receive UL data fragments from multiple devices. The access point may respond to the UL data fragments by transmitting a single uncompressed BA frame that includes uncompressed BA bitmaps corresponding to each of the multiple devices.

Figure 12:
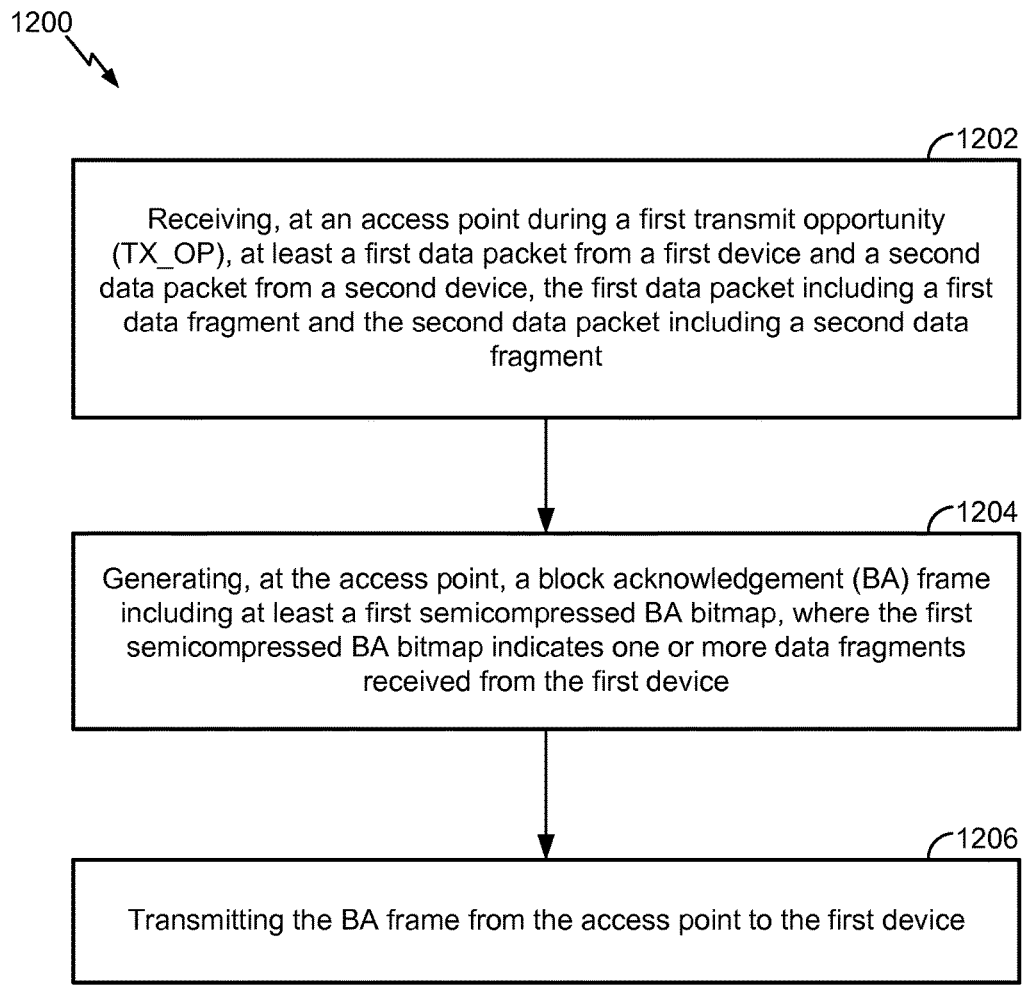
FIG. 12 is a flow diagram of an illustrative method of operation at an access point (of a wireless communication system)

Referring to FIG. 12, an illustrative implementation of a method 1200 of wireless communication is shown. For example, the method 1200 may be associated with operation at an access point of a MU wireless communication system. The method 1200 may be performed by the access point 102 of FIG. 1. In some implementations, steps of the method 1200 may be performed in other orders, or one or more steps of the method 1200 may be optional and may not be performed.

The method 1200 includes receiving, at an access point during a first transmit opportunity (TX_OP), at least a first data packet from a first device and a second data packet from a second device, at 1202. The first data packet may include a first data fragment and the second data packet may include a second data fragment. For example, with reference to FIG. 1, the access point 102 receives the first data packet including the first fragment 142 of the first data from the first device 114 during the first TX_OP. The access point 102 also receives the second data packet including the first fragment 146 of the second data from the second device 126 during the first TX_OP.

The method 1200 includes generating, at the access point, a BA frame including at least a first semicompressed BA bitmap, at 1204. The first semicompressed BA bitmap indicates one or more data fragments received from the first device. For example, with reference to FIG. 1, the uncompressed or semicompressed BA generation logic 106 of the access point 102 may generate the uncompressed or semicompressed BA frame 150 including at least the first semicompressed BA bitmap. The BA frame may be formed in accordance with an IEEE 802.11 standard. The BA frame may correspond to the semicompressed BA frame 800 of FIG. 8 or the semicompressed BA frame 900 of FIG. 9. In a particular implementation, the first data fragment is corresponding to a first data unit, and the first semicompressed BA bitmap indicates that the first data fragment has been received by the access point. Additionally, the semicompressed BA bitmap may indicate a fragment number of the first data fragment in a set of bits of the semicompressed BA bitmap that is allotted for a sequence number corresponding to the first data unit. For example, the semicompressed BA bitmap 802 of FIG. 8 may indicate that one or two data fragments corresponding to a particular MSDU have been received by the access point in sets of bits allotted for a sequence number corresponding to the particular MSDU. A data size of the first semicompressed BA bitmap may be less than a data size of an uncompressed BA bitmap. For example, a data size of the semicompressed BA bitmap 802 of FIG. 8 may be less than a data size of the uncompressed BA bitmap 628 of FIG. 6, and a data size of the semicompressed BA bitmap 906 of FIG. 9 may be less than a data size of the uncompressed BA bitmap 706 of FIG. 7 when only a few data fragments (such as one or two data fragments) are indicated by the semicompressed BA bitmap 802 or the semicompressed BA bitmap 906.

The method 1200 further includes transmitting the BA frame from the access point to the first device, at 1206. For example, with reference to FIG. 1, the access point 102 transmits the uncompressed or semicompressed BA frame 150 to the first device 114.

In a particular implementation, the method 1200 includes generating, at the access point, a second BA frame including a second semicompressed BA bitmap and transmitting the second BA frame from the access point to the second device. The second semicompressed BA bitmap may identify one or more data fragments received from the second device. For example, with reference to FIGS. 1 and 8, a second semicompressed BA frame (e.g., the semicompressed BA frame 800) including the second semicompressed BA bitmap 802 may be transmitted from the access point 102 to the second device 126. Additionally or alternatively, the BA frame may include a BA control field and a BA information field, the BA control field may include a bitmap compression bit and a set of reserved bits, and the BA information field may include a set of block acknowledgement starting sequence control bits and the first semicompressed BA bitmap. For example, with reference to FIG. 8, the semicompressed BA frame 800 may include the BA control field 610 and the BA information field 612, the BA control field 610 may include the bitmap compression bit 620 and the set of reserved bits 622, and the BA information field 612 may include the set of starting sequence control bits 626 and the semicompressed BA bitmap 802.

In a particular implementation, the bitmap compression bit has a first value, one or more bits of the set of reserved bits indicate that the BA frame includes the first semicompressed BA bitmap, the first semicompressed BA bitmap includes a plurality of bits indicating one or more data fragment identifiers, and each of the one or more data fragment identifiers corresponds to a data fragment of one of a plurality of data units corresponding to a particular block acknowledgement sequence. For example, when the bitmap compression bit 620 has a first value (such as a logical zero value), one or more bits of the set of reserved bits 622 indicate that the semicompressed BA frame 800 includes the semicompressed BA bitmap 802, and the semicompressed BA bitmap 802 is formed in accordance with the first implementation of the semicompressed BA bitmap 802, as described with reference to FIG. 8. In an alternate implementation, the bitmap compression bit has a second value, one or more bits of the set of reserved bits indicate that the BA frame includes the first semicompressed BA bitmap, and the first semicompressed BA bitmap includes a compressed block acknowledgement bitmap and a set of fragment identification subfields. Additionally, the compressed block acknowledgement bitmap may include a plurality of bits indicating one or more non-fragmented data units received by the access point from the first device, and the set of fragment identification subfields may include a sequence identifier subfield and a data fragment identifier. For example, when the bitmap compression bit 620 has a second value (such as a logical one value), one or more bits of the set of reserved bits 622 indicate that the semicompressed BA frame 800 includes the semicompressed BA bitmap 802, and the semicompressed BA bitmap 802 is formed in accordance with the second implementation of the semicompressed BA bitmap 802, as described with reference to FIG. 8.

In another particular implementation, the BA frame includes a second semicompressed BA bitmap, the second semicompressed BA bitmap indicates one or more data fragments received from the second device, and the BA frame is transmitted from the access point to the first device and to the second device. For example, with reference to FIGS. 1 and 9, a semicompressed BA frame 900 including two second semicompressed BA bitmaps 906 may be transmitted from the access point 102 to the first device 114 and to the second device 126. Additionally or alternatively, the BA frame may include a BA control field and a BA information field, the BA control field may include a bitmap compression bit and a set of reserved bits, and the BA information field may include a first set of per station information bits, a first set of block acknowledgement starting sequence control bits, the first semicompressed BA bitmap, a second set of per STA information bits, a second set of block acknowledgement starting sequence control bits, and the second semicompressed BA bitmap. For example, with reference to FIG. 9, the semicompressed BA frame 900 may include the BA control field 610 and the BA information field 612, the BA control field 610 may include the bitmap compression bit 620 and the set of reserved bits 622, and the BA information field 612 may include the multiple groups of the set of per STA information bits 902, the set of BA starting sequence control bits 904, and the semicompressed BA bitmap 906. In one particular aspect, the BA information field 612 may include two groups of the set of per STA information bits 902.

In a particular implementation, the bitmap compression bit has a first value, one or more bits of the set of reserved bits indicate that the block acknowledgment frame includes at least one semicompressed block acknowledgement bitmap, one or more reserved bits of the first set of per station information bits indicate an association identifier corresponding to the first device and a threshold (such as a maximum) number of data fragments into which data units are divided by the first device, and the first semicompressed block acknowledgment bitmap includes a plurality of bits indicating a data fragment identifier of a data fragment corresponding to each of a plurality of data units corresponding to a particular block acknowledgment sequence. For example, when the bitmap compression bit 620 has a first value (such as a logical zero value), one or more bits of the set of reserved bits 622 indicate that the semicompressed BA frame 900 includes the semicompressed BA bitmap 906, one or more reserved bits 908 of the first per STA information bits 902 indicate an AID corresponding to the first device and may include a threshold (such as a maximum) number of data fragments into which data units are divided by the first device, and the semicompressed BA bitmap 906 is formed in accordance with the first implementation of the semicompressed BA bitmap 802, as described with reference to FIG. 8. In an alternate implementation, the bitmap compression bit has a second value, one or more bits of the set of reserved bits indicate that the BA frame includes at least one semicompressed BA bitmap, one or more reserved bits of the first set of per STA information bits indicate an AID corresponding to the first device, the first semicompressed BA bitmap includes a compressed BA bitmap and a set of fragment identification subfields, and the set of fragment identification subfields includes a first sequence identifier subfield and a data fragment identifier. For example, when the bitmap compression bit 620 has a second value (such as a logical one value), one or more bits of the set of reserved bits 622 indicate that the semicompressed BA frame 900 includes the semicompressed BA bitmap 906, one or more reserved bits 908 of the first per STA information bits 902 indicate an AID corresponding to the first device, and the semicompressed BA bitmap 906 is formed in accordance with the second implementation of the semicompressed BA bitmap 802, as described with reference to FIG. 8.

In another exemplary implementation, a number of data units in a data unit sequence of the first device and a threshold (such as a maximum) number of data fragments into which data units are divided by the first device are stored in a memory of the access point during manufacturing of the access point. For example, with reference to FIG. 1, the number of MSDUs in an MSDU sequence of the first device 114 and a threshold (such as a maximum) number of data fragments (m or k) into which the data units are divided by the first device 114 may be stored in the memory 110 during manufacture of the access point 102. In an alternate implementation, the method 1200 further includes, prior to generating the BA frame, receiving a first BA session request. The first BA session request may indicate a threshold (such as a maximum) number of data units in a data unit sequence of the first device and a maximum number of data fragments into which data units are divided by the first device. For example, with reference to FIG. 1, the access point 102 may receive the first ADDBA request 162 from the first device 114 prior to generating the uncompressed or semicompressed BA frame 150, and the first ADDBA request 162 may indicate the threshold (such as the maximum) number of MSDUs in an MSDU sequence of the first device 114 and a threshold (such as a maximum) number of data fragments (m or k) into which the data units are divided by the first device 114.

The method 1200 enables an access point of a MU wireless communication system to receive UL data fragments from multiple devices. The access point may respond to the UL data fragments by transmitting one or more semicompressed BA frames that include semicompressed BA bitmaps to the multiple devices.

Figure 13:
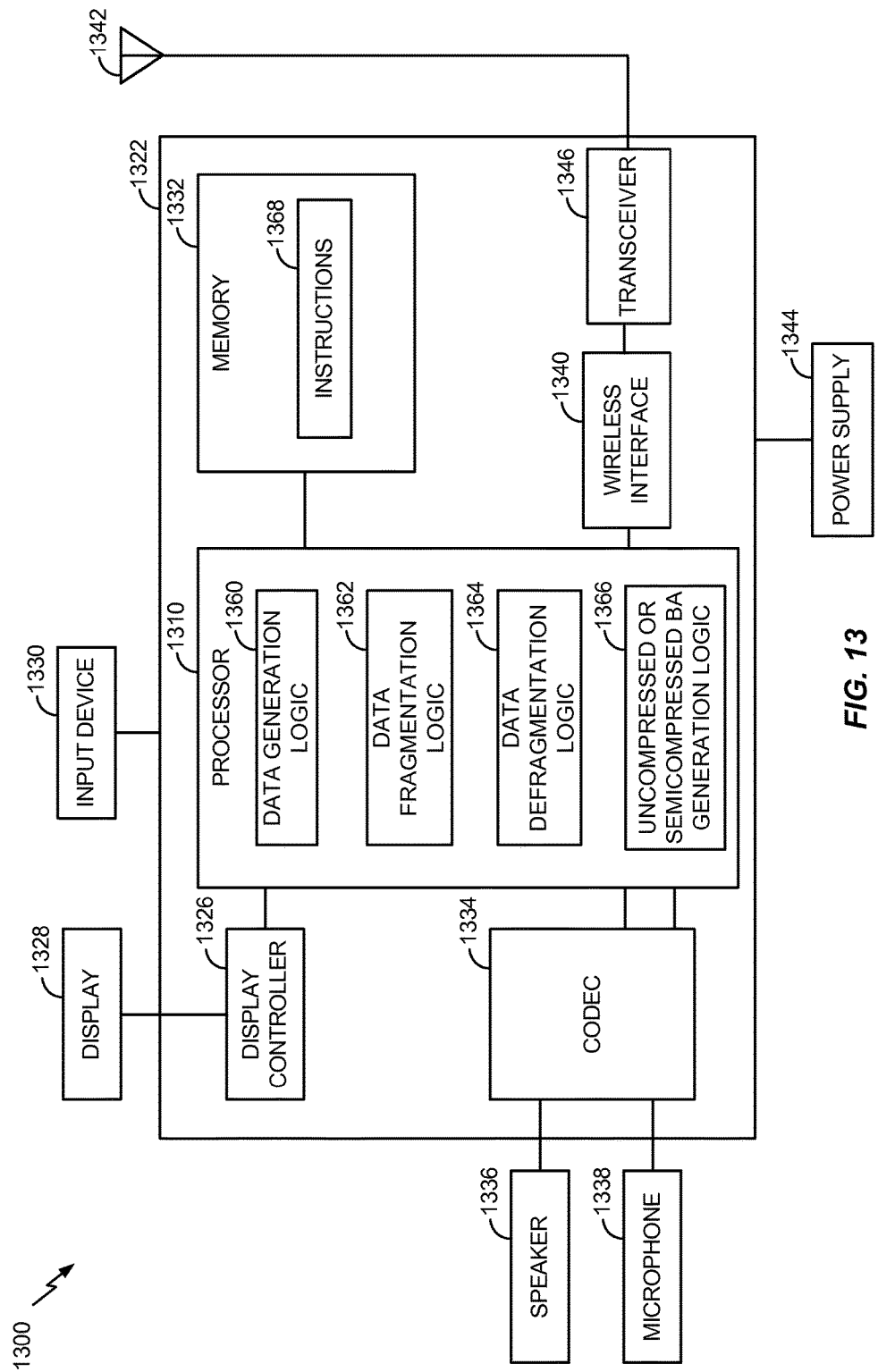
FIG. 13 is a diagram of a wireless device that is operable to support various implementations of one or more methods, systems, apparatuses, computer-readable media, or a combination thereof, disclosed herein.

Referring to FIG. 13, a particular illustrative implementation of a wireless communication device is depicted and generally designated 1300. The device 1300 includes a processor 1310, such as a digital signal processor, coupled to a memory 1332. In an illustrative implementation, the device 1300, or components thereof, may correspond to the access point 102, the first device 114, or the second device 126 of FIG. 1, or components thereof.

The processor 1310 may be configured to execute software. The software may include a program of one or more instructions 1368 stored in the memory 1332, such as a non-transitory computer readable medium. Additionally or alternatively, the processor 1310 may be configured to implement one or more instructions stored in a memory of a wireless interface 1340, such as an IEEE 802.11 compliant interface. For example, the wireless interface 1340 may be configured to operate in accordance with one or more wireless communication standards, including one or more IEEE 802.11 standards, such as the IEEE 802.11ax standard. In a particular implementation, the processor 1310 may be configured to operate in accordance with one or more of the methods of FIGS. 10-12. For example, the processor 1310 may include data generation logic 1360, data fragmentation logic 1362, data defragmentation logic 1364, uncompressed or semicompressed BA generation logic 1366, or a combination thereof. In a particular implementation, the processor 1310 includes the data generation logic 1360 and the data fragmentation logic 1362 to execute the method 1000 of FIG. 10. In another particular implementation, the processor 1310 includes the data defragmentation logic 1364 and the uncompressed or semicompressed BA generation logic 1366 to execute the method 1100 of FIG. 11.

The wireless interface 1340 may be coupled to the processor 1310 and to an antenna 1342. For example, the wireless interface 1340 may be coupled to the antenna 1342 via a transceiver 1346, such that wireless data may be received via the antenna 1342 and may be provided to the processor 1310. A coder/decoder (CODEC) 1334 can also be coupled to the processor 1310. A speaker 1336 and a microphone 1338 can be coupled to the CODEC 1334. A display controller 1326 can be coupled to the processor 1310 and to a display device 1328. In a particular implementation, the processor 1310, the display controller 1326, the memory 1332, the CODEC 1334, and the wireless interface 1340, are included in a system-in-package or system-on-chip device 1322. In a particular implementation, an input device 1330 and a power supply 1344 are coupled to the system-on-chip device 1322. Moreover, in a particular implementation, as illustrated in FIG. 13, the display device 1328, the input device 1330, the speaker 1336, the microphone 1338, the antenna 1342, and the power supply 1344 are external to the system-on-chip device 1322. However, each of the display device 1328, the input device 1330, the speaker 1336, the microphone 1338, the antenna 1342, and the power supply 1344 can be coupled to one or more components of the system-on-chip device 1322, such as one or more interfaces or controllers.

One or more of the disclosed implementations may be implemented in a system or an apparatus, such as the device 1300, that may include a communications device, a fixed location data unit, a mobile location data unit, a mobile phone, a cellular phone, a satellite phone, a computer, a tablet, a portable computer, or a desktop computer. Additionally, the device 1300 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof.

Although one or more of FIGS. 1-13 may illustrate systems, apparatuses, methods, or a combination thereof, according to the teachings of the disclosure, the disclosure is not limited to these illustrated systems, apparatuses, methods, or a combination thereof. Implementations of the disclosure may be suitably employed in any device that includes integrated circuitry including memory, a processor, and on-chip circuitry.

In conjunction with the described implementations, a first apparatus includes means for generating at least a first data fragment and a second data fragment based on data to be transmitted to an access point. The first data fragment and the second data fragment are generated when a size of the data exceeds a size of a TX_OP. A size of the first data fragment is selected based on the size of the TX_OP. For example, the means for generating at least the first data fragment and the second data fragment may include the first device 114, the data fragmentation logic 118, the processor 120 of FIG. 1, the processor 1310 programmed to execute the instructions 1368, the data fragmentation logic 1362 of FIG. 13, one or more other devices, circuits, modules, or instructions to generate at least a first data fragment and a second data fragment based on data to be transmitted to an access point, or any combination thereof.

The first apparatus also includes means for transmitting, during the TX_OP, a data packet to the access point. The data packet includes the first data fragment. For example, the means for transmitting the data packet may include the first device 114, the data fragmentation logic 118, the processor 120, the wireless interface 124 of FIG. 1, the processor 1310 programmed to execute the instructions 1368, the data fragmentation logic 1362, the wireless interface 1340 of FIG. 13, one or more other devices, circuits, modules, or instructions to transmit the data fragment to the access point, or any combination thereof.

In conjunction with the described implementations, a second apparatus includes means for generating a BA frame based on receipt of a first data packet from a first device and receipt of a second data packet from a second device. The first data packet includes a first data fragment and is received during a TX_OP, and the second data packet includes a second data fragment and is received during the TX_OP. The BA frame includes a first BA bitmap (indicating at least the first data fragment received from the first device) and a second BA bitmap (indicating at least the second data fragments received from the second device). For example, the means for generating the BA frame may include the access point 102, the uncompressed or semicompressed BA generation logic 106, the processor 108, the wireless interface 112 of FIG. 1, the processor 1310 programmed to execute the instructions 1368, the uncompressed or semicompressed BA generation logic 1366, the wireless interface 1340 of FIG. 13, one or more other devices, circuits, modules, or instructions to generate a BA frame including a first uncompressed BA bitmap and a second uncompressed BA bitmap, or any combination thereof. In a particular implementation, the first BA bitmap and the second BA bitmap are uncompressed BA bitmaps. In an alternate implementation, the first BA bitmap and the second BA bitmap are semicompressed BA bitmaps.

The second apparatus also includes means for transmitting the BA frame to the first device and to the second device. For example, the means for transmitting the BA frame may include the access point 102, the uncompressed or semicompressed BA generation logic 106, the processor 108, the wireless interface 112 of FIG. 1, the processor 1310 programmed to execute the instructions 1368, the uncompressed or semicompressed BA generation logic 1366, the wireless interface 1340 of FIG. 13, one or more other devices, circuits, modules, or instructions to transmit the BA frame to the first device and to the second device, or any combination thereof.

In conjunction with the described implementations, a third apparatus includes means for generating a BA frame based on receipt of at least a first data packet from a first device and a second data packet from a second device. The first data packet includes a first data fragment and is received during a TX_OP, and the second data packet includes a second fragment and is received during the TX_OP. The BA frame includes at least a first semicompressed BA bitmap (indicating one or more data fragments received from the first device). For example, the means for generating the BA frame may include the access point 102, the uncompressed or semicompressed BA generation logic 106, the processor 108, the wireless interface 112 of FIG. 1, the processor 1310 programmed to execute the instructions 1368, the uncompressed or semicompressed BA generation logic 1366, the wireless interface 1340 of FIG. 13, one or more other devices, circuits, modules, or instructions to generate a BA frame including a first semicompressed BA bitmap, or any combination thereof.

The third apparatus also includes means for transmitting the BA frame to the first device and to the second device. For example, the means for transmitting the BA frame may include the access point 102, the uncompressed or semicompressed BA generation logic 106, the processor 108, the wireless interface 112 of FIG. 1, the processor 1310 programmed to execute the instructions 1368, the uncompressed or semicompressed BA generation logic 1366, the wireless interface 1340 of FIG. 13, one or more other devices, circuits, modules, or instructions to transmit the BA frame to the first device and to the second device, or any combination thereof.

Those of skill in the art would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be included directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (or non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An apparatus for wireless communication, the apparatus comprising:
    data generation logic configured to generate data to be transmitted to an access point and to determine that a size of the data exceeds a size of a first transmit opportunity (TX_OP);
    data fragmentation logic configured to generate at least a first data fragment and a second data fragment based on the data, wherein a size of the first data fragment is selected based on the size of the first TX_OP; and
    a wireless interface configured to transmit, during the first TX_OP, a first data packet to the access point, the first data packet including the first data fragment, wherein the first data packet is sent responsive to a frame received from the access point, and wherein the frame includes timing information corresponding to the size of the first TX_OP.

2. The apparatus of claim 1, wherein:
    the data generation logic is further configured to determine, based on a modulation and coding scheme, a threshold amount of data capable of being transmitted during the first TX_OP; and
    the data fragmentation logic is further configured generate the first data fragment to have a size that is less than or equal to the threshold amount of data.

3. The apparatus of claim 1, wherein the frame comprises a trigger frame, and wherein the wireless interface is further configured to:
    receive, from the access point, a second trigger frame that includes second timing information corresponding to a second TX_OP; and transmit a second data packet that includes the second data fragment to the access point during the second TX_OP.

4. The apparatus of claim 1, wherein the wireless interface is further configured to receive, from the access point, a block acknowledgement frame that includes a first uncompressed block acknowledgement bitmap or a first semicompressed block acknowledgement bitmap.

5. The apparatus of claim 4, wherein the first uncompressed block acknowledgement bitmap or the first semi-compressed block acknowledgement bitmap indicates that at least the first data fragment was received at the access point.

6. The apparatus of claim 4, wherein the block acknowledgement frame includes the first uncompressed block acknowledgement bitmap, and wherein:
    the block acknowledgement frame includes a frame control field, a duration/identification field, a receiver address field, a transmitter address field, a block acknowledgement control field, a block acknowledgement information field, and a frame check sequence field, and
    the block acknowledgement control field includes an acknowledgement policy bit, a multi-traffic identifier bit, a bitmap compression bit, a set of reserved bits, and a set of multi-traffic identifier information bits.

7. The apparatus of claim 6, wherein the block acknowledgement information field includes multiple sets of per station information bits, multiple sets of block acknowledgement starting sequence control bits, and multiple uncompressed block acknowledgement bitmaps including the first uncompressed block acknowledgement bitmap and a second uncompressed block acknowledgement bitmap corresponding to another device.

8. The apparatus of claim 1, wherein the wireless interface is further configured to transmit, to the access point during a second TX_OP, a second data packet that includes the second data fragment, and wherein the size of the second data fragment is larger than the size of the first data fragment.

9. The apparatus of claim 1, wherein:
    the data generation logic is further configured to generate the data to be transmitted to the access point by generating a first media access control (MAC) layer service data unit, and
    the data fragmentation logic is further configured to generate the first data fragment by generating a first fragment of the first MAC layer service data unit and to generate the second data fragment by generating a second fragment of the first MAC layer service data unit.

10. The apparatus of claim 1, wherein a size of the second data fragment is selected based on a size of a second TX_OP, wherein the size of the first data fragment is different from the size of the second data fragment, and wherein the wireless interface is further configured to transmit, during the second TX_OP, a second data packet to the access point, the second data packet including the second data fragment.

11. The apparatus of claim 10, wherein the second data packet is sent responsive to a second frame received from the access point, wherein the second frame includes second timing information corresponding to the size of the second TX_OP, and wherein the size of the second TX_OP is different from the size of the first TX_OP.

12. The apparatus of claim 10, wherein the second data packet is sent responsive to a second frame received from the access point, and wherein the timing information of the frame indicates the size of the second TX_OP.

13. A method for wireless communication, the method comprising:
generating, at a first device, first data to be transmitted to an access point;
determining that a size of the first data exceeds a size of a first transmit opportunity (TX_OP);
generating at least a first data fragment and a second data fragment based on the first data, wherein a size of the first data fragment is selected based on the size of the first TX_OP; and
transmitting, during the first TX_OP, a first data packet from the first device to the access point, the first data packet including the first data fragment, wherein the first data packet is sent responsive to a frame received from the access point, and wherein the frame includes timing information corresponding to the size of the first TX_OP.

14. The method of claim 13, wherein:
the first data packet includes a first physical layer protocol data unit,
a payload of the first physical layer protocol data unit includes a first MAC layer protocol data unit, and
the first MAC layer protocol data unit includes the first data fragment.

15. The method of claim 13, further comprising transmitting a second data packet to the access point during a second TX_OP, the second data packet including a second physical layer protocol data unit, a payload of the second physical layer protocol data unit including a second MAC layer protocol data unit, and the second MAC layer protocol data unit including the second data fragment.

16. The method of claim 15, wherein the second physical layer protocol data unit includes an aggregated MAC layer protocol data unit that includes the second MAC layer protocol data unit, a third MAC layer protocol data unit, and a fourth MAC layer protocol data unit, and further comprising combining the second data fragment, a second MAC layer service data unit of the third MAC layer protocol data unit, and a first fragment of a third MAC layer service data unit of the fourth MAC layer protocol data unit to have a size that is less than or equal to a size of the second TX_OP.

17. The method of claim 13, wherein:
the first data includes a second MAC layer service data unit,
the first data packet includes a first physical layer protocol data unit,
a payload of the first physical layer protocol data unit includes an aggregated MAC layer protocol data unit,
the aggregated MAC layer protocol data unit includes a first MAC layer protocol data unit and a second MAC layer protocol data unit,
the first MAC layer protocol data unit includes the first data fragment, and
the second MAC layer protocol data unit includes the second MAC layer service data unit.

18. The method of claim 13, further comprising receiving, from the access point, a block acknowledgement frame that includes a first semicompressed block acknowledgement bitmap, and wherein:

the first semicompressed block acknowledgement bitmap indicates that the first data fragment was received by the access point, and
the first semicompressed block acknowledgement bitmap indicates a fragment number of the first data fragment in a set of bits of the first semicompressed block acknowledgement bitmap that is allotted for a sequence number corresponding to a first data unit.

19. The method of claim 18, wherein:
the block acknowledgement frame includes a block acknowledgement control field and a block acknowledgement information field,
the block acknowledgement control field includes a bitmap compression bit and a set of reserved bits, and
the block acknowledgement information field includes a set of block acknowledgement starting sequence control bits and the first semicompressed block acknowledgement bitmap.

20. The method of claim 19, wherein:
the bitmap compression bit has a first value,
one or more bits of the set of reserved bits indicate that the block acknowledgement frame includes the first semicompressed block acknowledgement bitmap,
the first semicompressed block acknowledgement bitmap includes a plurality of bits indicating one or more data fragment identifiers, and
each of the one or more data fragment identifiers corresponds to a data fragment of one of a plurality of data units corresponding to a particular block acknowledgement sequence.

21. The method of claim 19, wherein:
the bitmap compression bit has a second value,
one or more bits of the set of reserved bits indicate that the block acknowledgement frame includes the first semicompressed block acknowledgement bitmap, and
the first semicompressed block acknowledgement bitmap includes a compressed block acknowledgement bitmap and a set of fragment identification subfields.

22. The method of claim 21, wherein:
the compressed block acknowledgement bitmap includes a plurality of bits indicating one or more non-fragmented data units were received by the access point from the first device, and
the set of fragment identification subfields includes a sequence identifier subfield and a data fragment identifier.

23. The method of claim 13, further comprising receiving, from the access point, a block acknowledgement frame that includes a first semicompressed block acknowledgement bitmap and includes a second semicompressed block acknowledgement bitmap, and wherein the second semicompressed block acknowledgement bitmap indicates one or more data fragments that were received by the access point from a second device.

24. The method of claim 23, wherein:
the block acknowledgement frame includes a block acknowledgement control field and a block acknowledgement information field,
the block acknowledgement control field includes a bitmap compression bit and a set of reserved bits, and
the block acknowledgement information field includes a first set of per station information bits, a first set of block acknowledgement starting sequence control bits, the first semicompressed block acknowledgement bitmap, a second set of per station information bits, a second set of block acknowledgement starting sequence control bits, and the second semicompressed block acknowledgement bitmap.

25. The method of claim 24, wherein:
the bitmap compression bit has a first value,
one or more bits of the set of reserved bits indicate that the block acknowledgement frame includes at least one semicompressed block acknowledgement bitmap,
one or more reserved bits of the first set of per station information bits indicate an association identifier corresponding to the first device and a number of data fragments into which data units are divided by the first device,
the first semicompressed block acknowledgement bitmap includes a plurality of bits indicating a data fragment identifier of a data fragment, and
the data fragment corresponding to one of a plurality of data units corresponding to a particular block acknowledgement sequence.

26. The method of claim 24, wherein:
the bitmap compression bit has a second value,
one or more bits of the set of reserved bits indicate that the block acknowledgement frame includes at least one semicompressed block acknowledgement bitmap,
one or more reserved bits of the first set of per station information bits indicate an association identifier corresponding to the first device,
the first semicompressed block acknowledgement bitmap includes a compressed block acknowledgement bitmap and a set of fragment identification subfields, and
the set of fragment identification subfields includes a first sequence identifier subfield and a data fragment identifier.

27. An apparatus for wireless communication, the apparatus comprising:
means for generating at least a first data fragment and a second data fragment based on data to be transmitted to an access point, wherein the first data fragment and the second data fragment are generated responsive to a size of the data exceeding a size of a transmit opportunity (TX_OP) associated with multiple devices, and wherein a size of the first data fragment is selected based on the size of the TX_OP; and
means for transmitting a data packet to the access point during the TX_OP, the data packet including the first data fragment, wherein the data packet is sent responsive to a frame received from the access point, and wherein the frame includes timing information corresponding to the size of the first TX_OP.

28. The apparatus of claim 27, wherein the data packet is associated with uplink multi-user communication, wherein the data packet includes fragmentation information, and wherein the fragmentation information includes a sequence identifier (ID) number, a fragment number, and a more fragments indicator.

29. A non-transitory computer readable medium storing instructions that, when executed by a processor, cause the processor to:
generate, at a device, data to be transmitted to an access point;
determine that a size of the data exceeds a size of a transmit opportunity (TX_OP) associated with the device and one or more other devices;
generate at least a first data fragment and a second data fragment based on the data, wherein a size of the first data fragment is selected based on the size of the TX_OP; and
initiate transmission, during the TX_OP, of a data packet from the device to the access point, the data packet including the first data fragment, wherein the data packet is sent responsive to a frame received from the access point, and wherein the frame includes timing information corresponding to the size of the TX_OP.

30. The non-transitory computer readable medium of claim 29, wherein the size of the first data fragment is less than a size of the second data fragment, wherein the size of the TX_OP corresponds to a duration of the TX_OP, and wherein the frame further includes synchronization information indicating starting times of one or more TX_OPs.

* * * * *